United States Patent
Lee et al.

(10) Patent No.: US 11,302,949 B2
(45) Date of Patent: Apr. 12, 2022

(54) POLYMER ELECTROLYTE MEMBRANE, METHOD FOR MANUFACTURING SAME, AND MEMBRANE ELECTRODE ASSEMBLY COMPRISING SAME

(71) Applicant: KOLON INDUSTRIES, INC., Seoul (KR)

(72) Inventors: Dong-Hoon Lee, Seoul (KR); Na-Young Kim, Seoul (KR); Eun-Su Lee, Seoul (KR); Jung-Hwa Park, Seoul (KR)

(*) Notice: Subject to any disclaimer, the term of this patent is extended or adjusted under 35 U.S.C. 154(b) by 149 days.

(21) Appl. No.: 16/766,957

(22) PCT Filed: Nov. 30, 2018

(86) PCT No.: PCT/KR2018/015025
§ 371 (c)(1),
(2) Date: May 26, 2020

(87) PCT Pub. No.: WO2019/107996
PCT Pub. Date: Jun. 6, 2019

(65) Prior Publication Data
US 2021/0036353 A1    Feb. 4, 2021

(30) Foreign Application Priority Data

Nov. 30, 2017  (KR) .................. 10-2017-0163453
Nov. 28, 2018  (KR) .................. 10-2018-0150117

(51) Int. Cl.
*H01M 8/1044* (2016.01)
*H01M 8/1006* (2016.01)
(Continued)

(52) U.S. Cl.
CPC ....... *H01M 8/1044* (2013.01); *H01M 8/1006* (2013.01); *H01M 8/106* (2013.01);
(Continued)

(58) Field of Classification Search
CPC ............ H01M 8/1006; H01M 8/1039; H01M 8/1041; H01M 8/1044; H01M 8/1058;
(Continued)

(56) References Cited

U.S. PATENT DOCUMENTS

2015/0303505 A1* 10/2015 Lee .................. H01M 4/8875
                                                                429/482

FOREIGN PATENT DOCUMENTS

JP       10-334923 A    12/1998
JP     2001247741 A     9/2001
(Continued)

OTHER PUBLICATIONS

Counterpart European search report dated Jul. 28, 2021.
(Continued)

*Primary Examiner* — James M Erwin
(74) *Attorney, Agent, or Firm* — Harvest IP Law, LLP

(57) ABSTRACT

A polymer electrolyte membrane, a method for manufacturing the same, and a membrane electrode assembly containing the polymer electrolyte membrane are disclosed. The polymer electrolyte membrane includes: a fluorine-based support containing a plurality of pores due to polymer microfibrillar structures; a hybrid porous support placed on one side or both surfaces of the fluorine-based support and comprising nanowebs obtained by integrating nanofibers into a nonwoven fabric containing a plurality of pores; and ion conductors with which the pores of the porous support are filled. The polymer electrolyte membrane can reduce hydrogen permeability while being excellent in both durability and ion conductivity.

13 Claims, 4 Drawing Sheets

(51) Int. Cl.
  *H01M 8/1039* (2016.01)
  *H01M 8/106* (2016.01)
  *H01M 8/1062* (2016.01)
  *H01M 8/1058* (2016.01)
  *H01M 8/1041* (2016.01)
  *H01M 8/1067* (2016.01)
(52) U.S. Cl.
  CPC ....... *H01M 8/1039* (2013.01); *H01M 8/1041* (2013.01); *H01M 8/1058* (2013.01); *H01M 8/1062* (2013.01); *H01M 8/1067* (2013.01)
(58) Field of Classification Search
  CPC ... H01M 8/106; H01M 8/1062; H01M 8/1067
  USPC ......................................................... 429/483
  See application file for complete search history.

(56) References Cited

FOREIGN PATENT DOCUMENTS

| | | | | |
|---|---|---|---|---|
| JP | 4090108 | B2 | 5/2008 | |
| JP | 2014143006 | A | 9/2014 | |
| JP | 2014522552 | A | 9/2014 | |
| JP | 2017532716 | A | 11/2017 | |
| KR | 20070098157 | A | 10/2007 | |
| KR | 10-2011-0006122 | A | 1/2011 | |
| KR | 101178644 | B1 * | 8/2012 | ............. H01M 4/86 |
| KR | 10-2016-0038851 | A | 4/2016 | |
| KR | 10-2016-0059285 | A | 5/2016 | |
| KR | 10-2017-0112456 | A | 10/2017 | |
| WO | 9850457 | A1 | 11/1998 | |
| WO | 2015059848 | A1 | 4/2015 | |
| WO | 2017171285 | A2 | 5/2017 | |
| WO | 2017134117 | A1 | 8/2017 | |

OTHER PUBLICATIONS

Counterpart Japan office action dated Jun. 4, 2021.
International Search Report for PCT/KR2018/015025 dated Mar. 19, 2019 [PCT/ISA/210].
Written Opinion for PCT/KR2018/015025 dated Mar. 19, 2019 [PCT/ISA/237].

* cited by examiner

POLYMER ELECTROLYTE MEMBRANE, METHOD FOR MANUFACTURING SAME, AND MEMBRANE ELECTRODE ASSEMBLY COMPRISING SAME

CROSS REFERENCE TO RELATED APPLICATIONS

This application is a National Stage of International Application No. PCT/KR2018/015025 filed Nov. 30, 2018, claiming priority based on Korean Patent Application No. 10-2017-0163453 filed Nov. 30, 2017 and 10-2018-0150117 filed Nov. 28, 2018.

TECHNICAL FIELD

The present disclosure relates to a polymer electrolyte membrane, a method of producing the same and a membrane-electrode assembly including the same. More particularly, the present disclosure relates to a polymer electrolyte membrane that has excellent durability and ionic conductivity and is capable of reducing hydrogen permeability, a method of producing the same, and a membrane-electrode assembly including the same.

BACKGROUND ART

A fuel cell is a cell having electric-power-generating system for directly converting chemical reaction energy derived from an oxidation/reduction reaction between oxygen and hydrogen contained in a hydrocarbon-based material such as methanol, ethanol, or natural gas into electric energy. Fuel cells are in the spotlight as a next-generation green (clean) energy source capable of replacing fossil fuels owing to the high energy efficiency and environmental friendliness, that is, reduced pollutant emissions, thereof.

Such a fuel cell has the advantage of being capable of generating a wide range of power due to a stacked configuration based on lamination of unit cells, and is attracting a great deal of attention as a compact and portable power source due to the high energy density thereof, which is 4 to 10 times that of a small lithium battery.

The stack that substantially generates electricity In the fuel cell has a structure in which several to tens of unit cells are laminated, wherein each unit cell includes a membrane-electrode assembly (MEA) and a separator (also referred to as a "bipolar plate"), and the membrane-electrode assembly has a structure including an electrolyte membrane and an anode (also referred to as a "fuel electrode" or an "oxidization electrode") and a cathode (also referred to as an "air electrode" or a "reduction electrode") located on respective sides thereof.

The fuel cell may be classified into an alkaline electrolyte fuel cell, a polymer electrolyte fuel cell (PEMFC) and the like, depending on the state and type of the electrolyte. Among them, a polymer electrolyte fuel cell is receiving attention as a portable power supply for vehicular and domestic use due to the advantages of a low operating temperature of less than 100° C., quick start-up, rapid response and excellent durability.

Typical examples of the polymer electrolyte fuel cell include a proton exchange membrane fuel cell (PEMFC), which uses hydrogen gas as fuel, a direct methanol fuel cell (DMFC), which uses liquid methanol as fuel, or the like.

The reaction occurring in the polymer electrolyte fuel cell will be described in brief. First, when a fuel such as hydrogen gas is supplied to an anode, the hydrogen at the anode is oxidized to produce a proton (Hf) and an electron ($e^-$). The produced proton is transferred to the cathode through the polymer electrolyte membrane, whereas the generated electron is transferred to the cathode through an external circuit. At the cathode, oxygen is supplied, and the oxygen is bonded to the proton and electron to produce water via the reduction of oxygen.

Meanwhile, in order to realize the commercialization of the polymer electrolyte fuel cell, there are still many technical barriers to be overcome, and the essential factors to be improved include high performance, long life and low cost. The component having the greatest influence thereon is a membrane-electrode assembly. In particular, a polymer electrolyte membrane is one of the key factors that have the greatest influence on the performance and cost of the MEA.

The requirements for the polymer electrolyte membrane necessary for the operation of the polymer electrolyte fuel cell include high proton conductivity, chemical stability, low fuel permeability, high mechanical strength, low water content, excellent dimensional stability and the like. Conventional polymer electrolyte membranes have difficulty exhibiting normal high performance under certain temperature and relative humidity environments, particularly under high-temperature and low-humidity conditions. For this reason, a polymer electrolyte fuel cell, to which a conventional polymer electrolyte membrane is applied, has a limited range of application.

A polymer electrolyte membrane using a fluorine-based polymer material, which is generally used in fuel cells for transportation, has a disadvantage of low stability to radicals, that is, low chemical stability, due to the weak resistance to radicals generated during operation. In addition, a polymer electrolyte membrane has high proton conductivity due to wide proton-transporting passage, but has a disadvantage of high hydrogen permeability. In particular, commercial fuel cells for transportation, such as buses or trucks, which require high long-term stability, require high-durability polymer electrolyte membranes that can overcome these disadvantages.

DISCLOSURE

Technical Problem

Therefore, it is one object of the present disclosure to provide a polymer electrolyte membrane that has excellent durability and ionic conductivity and is capable of reducing hydrogen permeability.

It is another object of the present disclosure to provide a method of producing the polymer electrolyte membrane.

It is another object of the present disclosure to provide a membrane-electrode assembly including the polymer electrolyte membrane.

Technical Solution

In accordance with one aspect of the present disclosure to solve the technical problems, provided is a polymer electrolyte membrane comprising: a hybrid composite porous support, the hybrid composite porous support comprising a fluorine-based support including a plurality of pores due to a microstructure of polymer fibrils, and a nanoweb located on one or both surfaces of the fluorine-based support and including nanofibers which are integrated into a non-woven fabric such that the nanoweb includes a plurality of pores; and an ion conductor filling pores of the hybrid composite porous support.

The nanoweb may be formed on one or both surfaces of the fluorine-based support by electrospinning.

The fluorine-based support may have a thickness of 2 μm to 40 μm and the nanoweb may have a thickness of 10 μm to 50 μm.

The polymer electrolyte membrane may comprise the hybrid composite porous support that comprises any one selected from the group consisting of a first ion conductor layer including a first ion conductor located on one surface of the hybrid composite porous support, a second ion conductor layer including a second ion conductor located on the other surface of the hybrid composite porous support, and a combination of the first ion conductor layer and the second ion conductor layer.

The hybrid composite porous support may comprise the first ion conductor filling the pores in the one surface of the hybrid composite porous support, on which the first ion conductor layer is located, and the second ion conductor filling the pores in the other surface of the hybrid composite porous support, on which the second ion conductor layer is located.

The first ion conductor and the second ion conductor may be different from each other in terms of equivalent weight (EW).

The first ion conductor and the second ion conductor may be fluorinated polymers containing a fluorinated carbon skeleton and a side chain represented by the following Formula 1, and the first ion conductor and the second ion conductor have different side chain lengths:

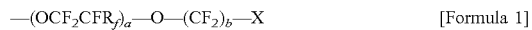
—(OCF$_2$CFR$_f$)$_a$—O—(CF$_2$)$_b$—X    [Formula 1]

wherein R$_f$ is each independently selected from the group consisting of F, Cl and a fluorinated alkyl group having 1 to 10 carbon atoms; X is an ion-conducting group; a is a real number of 0 to 3; and b is a real number of 1 to 5.

The first ion conductor and the second ion conductor may be polymers containing a hydrophilic repeating unit and a hydrophobic repeating unit, and the first ion conductor and the second ion conductor may have different molar ratios of the hydrophilic repeating unit to the hydrophobic repeating unit.

A molar ratio of the hydrophilic repeating unit to the hydrophobic repeating unit of the first ion conductor may be higher than a molar ratio of the hydrophilic repeating unit to the hydrophobic repeating unit of the second ion conductor.

In another aspect of the present disclosure, provided is a method for producing a polymer electrolyte membrane, the method comprising: preparing a fluorine-based support having a plurality of pores due to a microstructure of polymer fibrils; forming a nanoweb on one or both surfaces of the fluorine-based support by electrospinning, the a nanoweb including nanofibers integrated into a nonwoven fabric having a plurality of pores, thereby producing a hybrid composite porous support; and filling the pores of the hybrid composite porous support with an ion conductor.

The filling the pores of the hybrid composite porous support with an ion conductor may comprise: forming a first ion conductor layer including a first ion conductor on one surface of the hybrid composite porous support; and forming a second ion conductor layer including a second ion conductor on the other surface of the hybrid composite porous support.

In another aspect of the present disclosure, provided is a membrane-electrode assembly comprising: an anode and a cathode facing each other; and the polymer electrolyte membrane positioned between the anode and the cathode.

In another aspect of the present disclosure, provided is a full cell comprising the membrane-electrode assembly.

Advantageous Effects

The polymer electrolyte membrane according to the present disclosure has excellent durability and ionic conductivity and is capable of reducing hydrogen permeability.

BEST MODE

Figure 1:
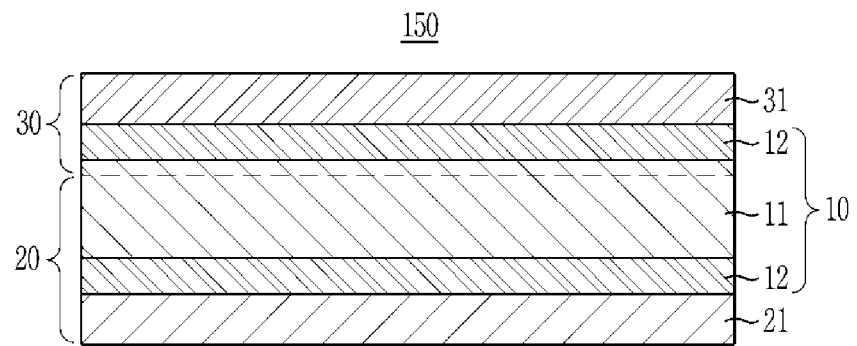
FIG. 1 is a schematic cross-sectional view showing a polymer electrolyte membrane according to an embodiment of the present disclosure.

Hereinafter, preferred embodiments of the present disclosure will be described in more detail such that a person having ordinary knowledge in the field to which the present disclosure pertains can easily implement the embodiments. However, the present disclosure can be implemented in a variety of different forms, and is not limited to the embodiments described herein.

Unless otherwise specified herein, an alkyl group includes a primary alkyl group, a secondary alkyl group and a tertiary alkyl group, and is a straight-chain or branched-chain alkyl group having 1 to 10 carbon atoms. A halogenated alkyl group is a straight-chain or branched-chain halogenated alkyl group having 1 to 10 carbon atoms, an allyl group is an allyl group having 2 to 10 carbon atoms, an aryl group is an aryl group having 6 to 30 carbon atoms, an alkoxy group is an alkoxy group having 1 to 10 carbon atoms, an alkyl sulfonyl group is an alkyl sulfonyl group having 1 to 10 carbon atoms, an acyl group is an acyl group having 1 to 10 carbon atoms and an aldehyde group is an aldehyde group having 1 to 10 carbon atoms.

Unless otherwise specified herein, an amino group includes a primary amino group, a secondary amino group and a tertiary amino group, and the secondary amino group or tertiary amino group is an amino group having 1 to 10 carbon atoms.

Unless otherwise specified herein, all compounds or substituents may be substituted or unsubstituted. As used herein, the term "substituted" means that hydrogen is replaced with any one selected from the group consisting of a halogen atom, a hydroxy group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof, and combinations thereof.

As used herein, the symbol "*" at respective ends of Formula indicates that the Formula is connected to another adjacent Formula.

In the present disclosure, an ion conductor including a repeating unit represented by one general formula may include only a repeating unit represented by one type of formula included in the general formula, or may include repeating units represented by several types of formulas.

The polymer electrolyte membrane according to an embodiment of the present disclosure comprises a porous support including a plurality of pores and an ion conductor filling the pores of the porous support.

The porous support may be a hybrid composite porous support that comprises a fluorine-based support including a plurality of pores formed by the microstructure of polymer fibrils, and a nanoweb located on one or both surfaces of the fluorine-based support and including nanofibers integrated into a non-woven fabric having a plurality of pores.

The fluorine-based support having the plurality of pores due to the microstructure of polymer fibrils specifically may include a plurality of pores formed by a microstructure including nodes interconnected via fibrils. The fluorine-based support may be an expanded fluorine-based support in order to include a plurality of pores formed by the aforementioned microstructure.

The fluorine-based support may include a fluorinated polymer having excellent resistance to thermal and chemical decomposition, preferably a perfluorinated polymer. For example, the fluorinated polymer may be polytetrafluoroethylene (PTFE) or a copolymer of tetrafluoroethylene and $CF_2=CFC_nF_{2n+1}$ (wherein n is an integer of 1 to 5) or $CF_2=CFO—(CF_2CF(CF_3)O)_mC_nF_{2n+1}$ (wherein m is an integer of 0 to 15 and n is an integer of 1 to 15).

The PTFE may be commercially available, and is suitable for use as the porous support, an expanded polytetrafluoroethylene (e-PTFE) sheet having a microstructure of polymer fibrils or a microstructure including nodes interconnected via fibrils is also suitable for use as the porous support, and PTFE, having a microstructure of polymer fibrils, in which no nodes are present, is also suitable for use as the porous support. The e-PTFE sheet may have pores of at least 35%, and the diameter of the micropores may be about 0.01 μm to 1 μm.

The fluorine-based support may have a thickness of 2 μm to 40 μm, preferably 5 μm to 20 μm. When the thickness of the fluorine-based support is less than 2 μm, mechanical strength may be significantly deteriorated, and when the thickness exceeds 40 μm, resistance loss may increase, and light weight and integration may be deteriorated.

The nanoweb located on one or both surfaces of the fluorine-based support may be a nanoweb in which nanofibers are integrated into a nonwoven fabric having a plurality of pores.

The nanofibers preferably use a polymer that has excellent chemical resistance and hydrophobicity and thus have no risk of shape modification due to moisture in a high-humidity environment. Specifically, examples of the polymer include: hydrocarbon-based polymers such as nylon, polyimide, polyaramid, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamideimide, polyethylene terephthalate, polyphenylene sulfide, polyethylene and polypropylene; fluoro-based polymers such as polyvinylidene fluoride (PVdF, polyvinylidene difluoride), tetrafluoroethylene hexafluoropropylene copolymers (FEP), tetrafluoroethylene (perfluoroacrylic)vinyl ether copolymers (PFA) and polytetrafluoroethylene (PTFE); copolymers thereof; and mixtures thereof.

The nanoweb may have a basic weight of 5 $g/m^2$ to 30 $g/m^2$. When the basic weight of the nanoweb is less than 5 $g/m^2$, it may not be capable of functioning as the porous support due to the formation of visible pores, and when the basic weight of the nanoweb exceeds 30 $g/m^2$, a paper or fabric having almost no pores may be produced.

The thickness of the nanoweb may be 10 μm to 50 μm, specifically 15 μm to 43 μm. When the thickness of the nanoweb is less than 10 μm, the mechanical strength may decrease, and when the thickness exceeds 50 μm, resistance loss may increase and light weight and integration may be deteriorated.

The hybrid composite porous support may have a porosity of 45% or more, specifically 60% or more. Meanwhile, the hybrid composite porous support preferably has a porosity of 90% or less. When the porosity of the hybrid composite porous support exceeds 90%, the shape stability is lowered and thus post-processing may not proceed smoothly. The porosity can be calculated as the ratio of the total volume of the hybrid composite porous support to the volume of air in accordance with Equation 1 below. At this time, the total volume is calculated by measuring the width, length, and thickness of a prepared rectangular sample, and the air volume can be obtained by measuring the weight of the sample and subtracting the polymer volume, calculated from the density, from the total volume.

$$\text{Porosity (\%)} = (\text{Volume of air in hybrid composite porous support/total volume of hybrid composite porous support}) \times 100 \quad \text{[Equation 1]}$$

The hybrid composite porous support is a porous support in which the heterogeneous (hybrid) materials of the fluorine-based support and the nanoweb are combined, and the formation of the composite with hybrid materials can improve mechanical strength and reduce resistance.

In addition, although it is possible to stack a nanoweb on the fluorine-based support, the nanoweb is formed by directly electrospinning onto one or both surfaces of the fluorine-based support to form a composite structure, so that an integration enhancement effect unobtainable through a simple stacking can be achieved.

The polymer electrolyte membrane is a reinforced composite membrane-type polymer electrolyte membrane in which the pores of the hybrid composite porous support are filled with an ion conductor.

In this case, the polymer electrolyte membrane may include a first ion conductor layer located on one surface of the hybrid composite porous support and a second ion conductor layer located on the other surface of the hybrid composite porous support. The first ion conductor layer and the second ion conductor layer may be formed when the ion conductor left after filling the pores of the hybrid composite porous support forms a thin film on the surface of the hybrid composite porous support.

FIG. 1 is a cross-sectional view schematically illustrating an example of the polymer electrolyte membrane 150.

Referring to FIG. 1, the polymer electrolyte membrane 150 includes a hybrid composite porous support 10 that includes: a fluorine-based support 11 having a plurality of pores due to the microstructure of the polymer fibrils; and a nanoweb 12 located on both surfaces of the fluorine-based support 11 and including nanofibers integrated into a non-woven fabric having a plurality of pores.

The first ion conductor layer 21 is located on one surface of the hybrid composite porous support 10, and the second ion conductor layer 31 is located on the other surface of the hybrid composite porous support 10.

The first ion conductor layer 21 may include a first ion conductor 20, the second ion conductor layer 31 may include a second ion conductor 30, and the hybrid composite porous support 10 may include any one selected from the group consisting of the first ion conductor 20, the second ion conductor 30 and a combination thereof. However, the present disclosure is not limited thereto, and the first ion conductor layer 21 and the second ion conductor layer 31 may include the same ion conductor, and thus the pores of the hybrid composite porous support 10 can also be filled with one ion conductor.

Specifically, the case in which the hybrid composite porous support 10 includes a combination of the first ion conductor 20 and the second ion conductor 30 will be described in detail. The first ion conductor 20 may fill the pores in the surface of the hybrid composite porous support 10 on which the first ion conductor layer 21 is located, and the second ion conductor 30 may fill the pores in the other surface of the hybrid composite porous support 10, on which the second ion conductor layer 30 is located.

However, the present disclosure is not limited to what is shown in FIG. 1, and the pores of the hybrid composite porous support 10 may be filled with only the first ion conductor 20 or the second ion conductor 30.

The first ion conductor and the second ion conductor may be different from each other, and specifically, the first ion conductor and the second ion conductor may be different from each other in terms of equivalent weight (EW) or ion exchange capacity (IEC).

Specifically, the first ion conductor may have an equivalent weight (EW) of 300 g/eq to 950 g/eq, specifically 400 g/eq to 750 g/eq, and the second ion conductor may have an equivalent weight (EW) of 650 g/eq to 1500 g/eq, specifically 800 g/eq to 1100 g/eq. In addition, the first ion conductor may have an ion exchange capacity (IEC) of 1.0 meq/g to 3.5 meq/g, specifically more than 1.3 meq/g and not more than 2.5 meq/g, and the second ion conductor may have an ion exchange capacity (IEC) of 0.6 meq/g to 1.6 meq/g, specifically 0.9 meq/g to 1.3 meq/g.

That is, the first ion conductor can exhibit high ionic conductivity efficiency, and the second ion conductor can secure shape stability and durability of the polymer electrolyte membrane while reducing swelling of the polymer electrolyte membrane.

Therefore, by introducing the first ion conductor onto one surface of the porous support, the performance of ionic conductivity can be improved, the membrane resistance can be reduced, and thus the performance efficiency of the fuel cell can be improved. By introducing the second ion conductor onto the other surface of the porous support, the shape stability of the polymer electrolyte membrane and the durability of the polymer electrolyte membrane can be secured.

The thickness ratio of the first ion conductor layer with respect to the total thickness of the porous support is 10% to 200% by length, specifically 50% to 100% by length, and the thickness of the second ion conductor layer with respect to the total thickness of the porous support is 10% to 200%, specifically 50% to 100%. When the thickness of the first ion conductor layer and the second ion conductor layer is less than 10% by length, desired ion conductivity may not be obtained, and when the thickness ratio exceeds 200% by length, the porous support is incapable of functioning as a support and, durability may be deteriorated to thus be similar to that of a single membrane. The thickness of the ion conductor layer on one surface can be calculated using Equation 2 below.

Thickness (length %) of ion conductor layer on one surface=(thickness of ion conductor layer on one surface/thickness of porous support)×100      [Equation 2]

Considering the effects obtained by introducing the first ion conductor and the second ion conductor, the ratio of the thickness of the first ion conductor or the second ion conductor to the total thickness of the polymer electrolyte membrane is 9:1 to 1:9, specifically 9:1 to 6:4, and more specifically 8:2 to 6:4.

That is, it is advantageous that the thickness of the first ion conductor be greater than the thickness of the second ion conductor in order to obtain morphological stability of the polymer electrolyte membrane while improving the ionic conductivity of the polymer electrolyte membrane.

Here, the thickness of the first ion conductor is the sum of the thickness of the first ion conductor impregnated into the pores of the porous support and the thickness of the first ion conductor layer. Similarly, the thickness of the second ion conductor is the sum of the thickness of the second ion conductor impregnated into the pores of the porous support and the thickness of the second ion conductor layer.

In addition, considering the effects obtained by introducing the first ion conductor and the second ion conductor, the pores of the porous support may be filled with the first ion conductor, the first ion conductor layer may be formed on one surface of the porous support, and the second ion conductor layer may be formed on the other surface of the porous support.

Meanwhile, each of the first ion conductor and the second ion conductor may independently be a cation conductor having a cation-conducting group, such as a proton, or an anion conductor having an anion-conducting group, such as a hydroxy ion, carbonate or bicarbonate.

The cation-conducting group may be any one selected from the group consisting of a sulfonic acid group, a carboxyl group, a boronic acid group, a phosphoric acid groups, an imide groups, a sulfonimide group, a sulfonamide group, a sulfonic acid fluoride group, and a combination thereof, and is generally a sulfonic acid group or a carboxyl group.

Examples of the cation conductor include: fluorine-based polymers having the cation-conducting group and containing fluorine in the main chain thereof; hydrocarbon-based polymers such as benzimidazole, polyamide, polyamideimide, polyimide, polyacetal, polyethylene, polypropylene, acrylic resin, polyester, polysulfone, polyether, polyetherimide, polyester, polyethersulfone, polyetherimide, polycarbonate, polystyrene, polyphenylene sulfide, polyether ether ketone, polyether ketone, polyaryl ether sulfone, polyphosphazene or polyphenylquinoxaline; partially fluorinated polymers such as polystyrene-graft-ethylenetetrafluoroethylene copolymers or polystyrene-graft-polytetrafluoroethylene copolymer; sulfone imide and the like.

More specifically, when the cation conductor is a proton cation conductor, the polymers described above may include, at the side chain thereof, a cation-conducting group selected from the group consisting of a sulfonic acid group, a carboxylic acid group, a phosphoric acid group, a phosphonic acid group and a derivative thereof. Specific examples thereof include, but are not limited to: fluorinated polymers including poly(perfluorosulfonic acid), poly(perfluorocarboxylic acid), copolymers of fluorovinyl ether and tetrafluoroethylene containing a sulfonic acid group, defluorinated sulfide polyether ketone or mixtures thereof; hydrocarbon-based polymers such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof.

The anion conductor is a polymer capable of transporting anions such as hydroxy ions, carbonates or bicarbonates, commercially available anion conductors include hydroxide or halide (generally chloride)-type anion conductors, and the anion conductors can be used for industrial water purification, metal separation or catalyst processes.

The anion conductor that is generally used is a polymer doped with metal hydroxide. Specifically, the anion conductor may be poly(ethersulfone), polystyrene, a vinyl-based polymer, poly(vinyl chloride), poly(vinylidene fluoride), poly(tetrafluoroethylene), poly(benzimidazole), or poly(ethylene glycol), each of which is doped with a metal hydroxide, or the like.

Specifically, the first ion conductor and the second ion conductor are fluorinated polymers containing fluorinated side chains, and the first ion conductor and the second ion conductor may have side chains having different lengths in order to increase ionic conductivity while securing the shape stability of the polymer electrolyte membrane, as described above.

As used herein, the term "fluorinated" means that at least 90 mol % of the total number of halogen and hydrogen atoms is substituted with fluorine atoms.

The fluorinated polymer includes a polymer skeleton and cyclic side chains attached to the skeleton, and the side chains may have the ion-conducting group. For example, the fluorinated polymer may be a copolymer of a first fluorinated vinyl monomer and a second fluorinated vinyl monomer having a sulfonic acid group.

The first fluorinated vinyl monomer is tetrafluoroethylene (TFE), hexafluoropropylene, vinyl fluoride, vinylidene fluoride, trifluoroethylene, chlorotrifluoroethylene, perfluoro(alkyl vinyl ether), and a mixture thereof, and the second fluorinated vinyl monomer having a sulfonic acid group may be any one of various fluorinated vinyl ethers having a sulfonic acid group.

More specifically, the side chain may be represented by Formula 1 below.

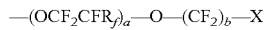
—(OCF$_2$CFR$_f$)$_a$—O—(CF$_2$)$_b$—X    [Formula 1]

wherein R$_f$ is each independently selected from the group consisting of F, Cl and a fluorinated alkyl group having 1 to 10 carbon atoms, X is an ion-conducting group, specifically, a sulfonic acid group, a is a real number of 0 to 3, specifically a real number of 0 to 1, and b is a real number of 1 to 5, specifically a real number of 2 to 4.

In this case, the side chain length "a+b" of the first ion conductor may be 2 to 6, specifically 3 to 5, and the side chain length "a+b" of the second ion conductor may be 4 to 8, specifically, more than 5 and not more than 7. When the side chain length "a+b" of the first ion conductor is less than 2, the structural stability and chemical durability of the polymer electrolyte membrane may be deteriorated due to excessive moisture absorption, and when the side chain length exceeds 6, ion conductivity and performance may be deteriorated. When the side chain length "a+b" of the second ion conductor is less than 4, tensile strength and durability may be deteriorated, and when the side chain length exceeds 8, ion conductivity and performance may be deteriorated.

In addition, specifically, the first ion conductor and the second ion conductor include polymers containing a hydrophilic repeating unit and a hydrophobic repeating unit, and the first ion conductor and the second ion conductor may have different molar ratios of the hydrophilic repeating unit to the hydrophobic repeating unit.

At least one monomer constituting the hydrophilic repeating unit is substituted by the ion-conducting group, and the monomer constituting the hydrophobic repeating unit may be not substituted with the ion-conducting group, or may be substituted with a smaller number of ion-conducting groups than the hydrophilic repeating unit. In addition, although all monomers constituting the hydrophilic repeating unit may include the ion-conducting group, the hydrophilic repeating unit may include a monomer substituted with the ion-conducting group and a monomer not substituted with the ion-conducting group.

The first ion conductor and the second ion conductor may be random copolymers in which the hydrophilic repeating units and the hydrophobic repeating units are randomly connected, or may be block copolymers including hydrophobic blocks having the hydrophilic repeating units and hydrophobic blocks having the hydrophobic repeating units.

More specifically, the first ion conductor and the second ion conductor may each independently include a monomer in which the hydrophilic repeating unit is represented by Formula 2 below.

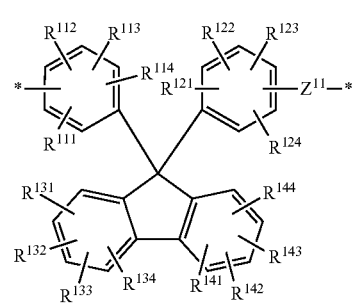

[Formula 2]

wherein $R^{111}$ to $R^{114}$, $R^{121}$ to $R^{124}$, $R^{131}$ to $R^{134}$ and $R^{141}$ to $R^{144}$ are each independently any one selected from the group consisting of a hydrogen atom, a halogen atom, an ion-conducting group, an electron-donating group and an electron-withdrawing group.

The halogen atom may be any one selected from the group consisting of bromine, fluorine and chlorine.

The ion-conducting group may be any one cation-conducting group selected from the group consisting of a sulfonic acid group, a carboxylic acid group and a phosphoric acid group as described above, and the cation-conducting group is preferably a sulfonic acid group. Further, the ion-conducting group may be an anion-conducting group such as an amine group.

Further, the electron-donating group is an organic group that provides an electron and may be any one selected from the group consisting of an alkyl group, an allyl group, an aryl group, an amino group, a hydroxy group and an alkoxy group, and the electron-withdrawing group is an organic group that attracts an electron and is any one selected from the group consisting of an alkyl sulfonyl group, an acyl group, a halogenated alkyl group, an aldehyde group, a nitro group, a nitroso group and a nitrile group.

The alkyl group may be a methyl group, an ethyl group, a propyl group, a butyl group, an isobutyl group, an amyl group, a hexyl group, a cyclohexyl group, an octyl group, or the like, the halogenated alkyl group may be a trifluoromethyl group, a pentafluoroethyl group, a perfluoropropyl group, a perfluorobutyl group, a perfluoropentyl group, a perfluorohexyl group or the like, the allyl group may be a propenyl group or the like, and the aryl group may be a phenyl group, a pentafluorophenyl group, or the like. The perfluoroalkyl group is an alkyl group in which some or all hydrogen atoms are substituted with fluorine.

$Z^{11}$ is a divalent organic group and may be —O— or —S—, preferably —O—.

In this case, in order for the repeating unit including the monomer represented by Formula 2 to be the hydrophilic repeating unit, at least one of $R^{111}$ to $R^{114}$, $R^{121}$ to $R^{124}$, $R^{131}$ to $R^{134}$, or $R^{141}$ to $R^{144}$ in the monomer represented by Formula 2 may be an ion-conducting group.

Specifically, the hydrophilic repeating unit may be represented by the following Formula 2-1 or Formula 2-2:

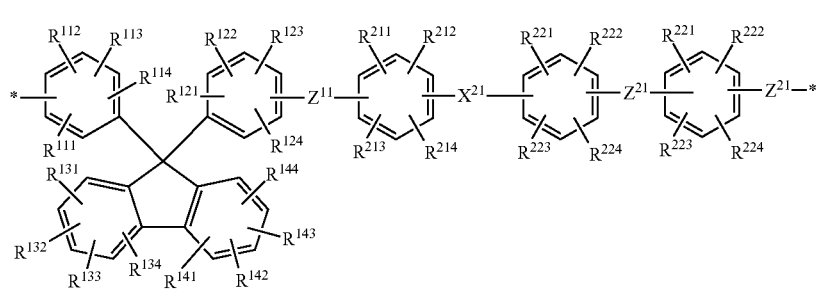

[Formula 2-1]

wherein $R^{111}$ to $R^{114}$, $R^{121}$ to $R^{124}$, $R^{131}$ to $R^{134}$ and $R^{141}$ to $R^{144}$ are as defined in detail above. Thus, a detailed description thereof will not be repeated.

$R^{211}$ to $R^{214}$, $R^{221}$ to $R^{224}$ and $R^{231}$ to $R^{234}$ are each independently any one selected from the group consisting of: a hydrogen atom; a halogen atom; an electron-donating group selected from the group consisting of an alkyl group, an allyl group, an aryl group, an amino group, a hydroxy group and an alkoxy group; and an electron-withdrawing group selected from the group consisting of an alkyl sulfonyl group, an acyl group, a halogenated alkyl group, an aldehyde group, a nitro group, a nitroso group and a nitrile group. These substituents are as defined in detail above, and thus a detailed description thereof will not be repeated.

$X^{21}$ and $X^{22}$ may be each independently a single bond or a divalent organic group. The divalent organic group is a divalent organic group that attracts or donates an electron and specifically may be any one selected from —CO—, —SO$_2$—, —CONH—, —COO—, —CR'$_2$—, —C(CH$_3$)$_2$—, —C(CF$_3$)$_2$— and —(CH$_2$)$_n$—. In this case, R' is any one selected from the group consisting of a hydrogen atom, a halogen atom, an alkyl group and a halogenated alkyl group, and n may be an integer from 1 to 10. The case in which $X^{21}$ or $X^{22}$ is a single bond means that the phenyl groups present at both sides of X are directly bonded, a typical example thereof being a biphenyl group.

$Z^{21}$ is a divalent organic group, and may be —O— or —S—, preferably —O—.

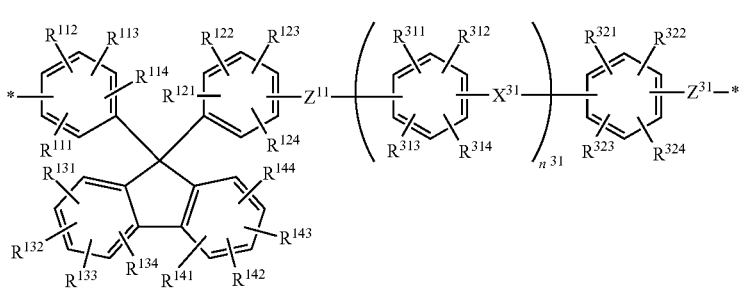

[Formula 2-2]

wherein $R^{111}$ to $R^{114}$, $R^{123}$ to $R^{124}$, $R^{131}$ to $R^{134}$ and $R^{141}$ to $R^{144}$ and $Z^{11}$ are as defined in detail above. Thus, a detailed description thereof will not be repeated.

$R^{311}$ to $R^{314}$ and $R^{321}$ to $R^{324}$ are each independently any one selected from the group consisting of: a hydrogen atom; a halogen atom; an ion-conducting group; an electron-donating group selected from the group consisting of an alkyl group, an allyl group, an aryl group, an amino group, a hydroxy group and an alkoxy group; and an electron-withdrawing group selected from the group consisting of an alkyl sulfonyl group, an acyl group, a halogenated alkyl group, an aldehyde group, a nitro group, a nitroso group, and a nitrile group. These substituents are as defined in detail above, and thus a detailed description thereof will not be repeated.

$X^{31}$ is any one divalent organic group selected from a single bond, —CO—, —SO$_2$—, —CONH—, —COO—, —CR'$_2$—, —(CH$_2$)$_n$—, a cyclohexylidene group, a cyclohexylidene group containing an ion-conducting group, a fluorenylidene group, a fluorenylidene group containing an ion-conducting group, —C(CH$_3$)$_2$—, —C(CF$_3$)$_2$—, —O— and —S—, and R' is any one selected from the group consisting of a hydrogen atom, a halogen atom, an alkyl group and a halogenated alkyl group, and n is an integer from 1 to 10. These substituents are as defined in detail above, and thus a detailed description thereof will not be repeated.

However, the cyclohexylidene group containing an ion-conducting group or the fluorenylidene group containing an ion-conducting group is a group, the hydrogen of which is substituted with any one ion-conducting group selected from the group consisting of a sulfonic acid group, a carboxylic acid group, a phosphoric acid group and a combination thereof.

$Z^{31}$ is a divalent organic group, and may be —O— or —S—, preferably —O—.

$n^{31}$ may be an integer from 0 to 10, preferably an integer of 0 or 1.

Meanwhile, the first ion conductor and the second ion conductor may each independently include a monomer in which the hydrophobic repeating unit is represented by Formula 3 below.

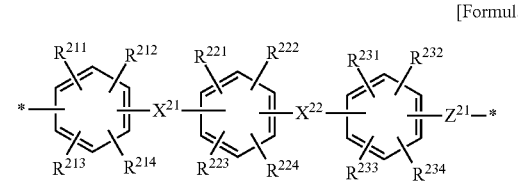

[Formula 3]

wherein $R^{211}$ to $R^{214}$, $R^{221}$ to $R^{224}$ and $R^{231}$ to $R^{234}$, $X^{21}$, $X^{22}$ and $Z^{21}$ are as defined in detail above. Thus, a detailed description thereof will not be repeated.

Specifically, the hydrophobic repeating unit may be represented by the following Formula 3-1:

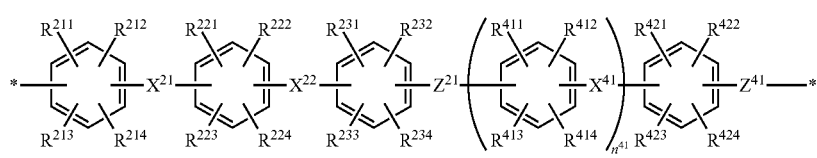

[Formula 3-1]

wherein $R^{211}$ to $R^{214}$, $R^{221}$ to $R^{224}$ and $R^{231}$ to $R^{234}$, $X^{21}$, $X^{22}$ and $Z^{21}$ are as defined in detail above. Thus, a detailed description thereof will not be repeated.

$R^{411}$ to $R^{414}$ and $R^{421}$ to $R^{424}$ are each independently any one selected from the group consisting of: a hydrogen atom; a halogen atom; an electron-donating group selected from the group consisting of an alkyl group, an allyl group, an aryl group, an amino group, a hydroxy group and an alkoxy group; and an electron-withdrawing group selected from the group consisting of an alkyl sulfonyl group, an acyl group, a halogenated alkyl group, an aldehyde group, a nitro group, a nitroso group and a nitrile group. These substituents are as defined in detail above, and thus a detailed description thereof will not be repeated.

$X^{41}$ is any one divalent organic group selected from a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, and R' is any one selected from the group consisting of a hydrogen atom, a halogen atom, an alkyl group, and a halogenated alkyl group, and n is an integer from 1 to 10. These substituents are as defined in detail above, and thus a detailed description thereof will not be repeated.

$Z^{41}$ is a divalent organic group, and may be —O— or —S—, preferably —O—.

$n^{41}$ may be an integer from 0 to 10, preferably an integer of 0 or 1.

Meanwhile, the first ion conductor and the second ion conductor may each independently include a monomer in which the hydrophobic repeating unit is represented by the following Formula 4:

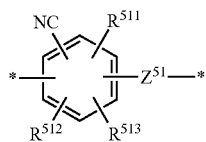

[Formula 4]

wherein $R^{511}$ to $R^{513}$ are each independently any one selected from the group consisting of: a hydrogen atom; a halogen atom; an electron-donating group selected from the group consisting of an alkyl group, an allyl group, an aryl group, an amino group, a hydroxy group and an alkoxy group; and an electron-withdrawing group selected from the group consisting of an alkyl sulfonyl group, an acyl group, a halogenated alkyl group, an aldehyde group, a nitro group, a nitroso group and a nitrile group. These substituents are as defined in detail above, and thus a detailed description thereof will not be repeated.

$Z^{51}$ is a divalent organic group, and may be —O— or —S—, preferably —O—.

Specifically, the hydrophobic repeating unit may be represented by the following Formula 4-1:

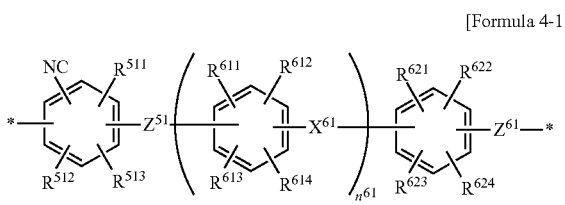

[Formula 4-1]

wherein $R^{511}$ to $R^{513}$, and $Z^{51}$ are as defined in detail above. Thus, a detailed description thereof will not be repeated.

$R^{611}$ to $R^{614}$ and $R^{621}$ to $R^{624}$ are each independently any one selected from the group consisting of: a hydrogen atom; a halogen atom; an electron-donating group selected from the group consisting of an alkyl group, an allyl group, an aryl group, an amino group, a hydroxy group and an alkoxy group; and an electron-withdrawing group selected from the group consisting of an alkyl sulfonyl group, an acyl group, a halogenated alkyl group, an aldehyde group, a nitro group, a nitroso group and a nitrile group. These substituents are as defined in detail above, and thus a detailed description thereof will not be repeated.

$X^{61}$ is any one divalent organic group selected from a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, and R' is any one selected from the group consisting of a hydrogen atom, a halogen atom, an alkyl group and a halogenated alkyl group, and n is an integer from 1 to 10. These substituents are as defined in detail above, and thus a detailed description thereof will not be repeated.

$Z^{61}$ is a divalent organic group, and may be —O— or —S—, preferably —O—.

$n^{61}$ may be an integer from 0 to 10, preferably an integer of 0 or 1.

Meanwhile, the hydrophobic repeating unit of the first ion conductor and the second ion conductor may each independently be represented by the following Formula 5-1:

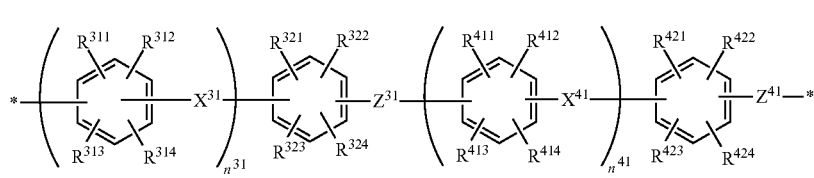

[Formula 5-1]

wherein $R^{311}$ to $R^{314}$, $R^{321}$ to $R^{324}$, $R^{411}$ to $R^{414}$, $R^{421}$ to $R^{424}$, $X^{31}$, $X^{41}$, $Z^{31}$, $Z^{41}$, $n^{31}$ and $n^{41}$ are as defined in detail above. Thus, a detailed description thereof will not be repeated. $X^{31}$ and $X^{41}$ may be different from each other.

In order for the repeating units represented by Formulas 3-1, 4-1 and 5-1 to be hydrophobic repeating units, in the repeating units represented by Formulas 3-1, 4-1 and 5-1, $R^{211}$ to $R^{214}$, $R^{221}$ to $R^{224}$, $R^{231}$ to $R^{234}$, $R^{311}$ to $R^{314}$, $R^{321}$ to $R^{324}$, $R^{411}$ to $R^{414}$, $R^{421}$ to $R^{424}$, $R^{511}$ to $R^{513}$, $R^{611}$ to $R^{614}$, and $R^{621}$ to $R^{624}$ substantially do not include an ion-conducting group. Here, the expression "substantially do not include an ion-conducting group" means that the substituents may include a small amount of ion-conducting group, as long as the amount does not interfere with the phase separation of the hydrophilic and hydrophobic regions.

Meanwhile, each of the first ion conductor and the second ion conductor may further independently include a monomer in which the hydrophilic repeating unit or the hydrophobic repeating unit is represented by Formula 6 below.

When the first ion conductor or the second ion conductor further includes the monomer represented by Formula 6 above, the first ion conductor or the second ion conductor includes a nitrogen-containing aromatic ring group in the main chain, thus having improved resistance to radical attacks and acid-base interactions. As a result, the first ion conductor and the second ion conductor cause neither an addition reaction at the aromatic ring of the polymer electrolyte membrane nor breakage of the aromatic ring due to the attack of radicals formed at the cathode during the operation of the fuel cell, thus maximizing the function of the ion-conducting group and improving the operation performance of the fuel cell at low humidities.

$$*\text{—}(Y\text{—}Z)\text{—}* \qquad \text{[Formula 6]}$$

wherein Z is —O— or —S—, and preferably —O—.

Y is a divalent nitrogen-containing aromatic ring group. The nitrogen-containing aromatic ring group is an aromatic ring containing at least one nitrogen atom as a hetero atom. In addition, the nitrogen-containing aromatic ring group may contain an oxygen atom, a sulfur atom or the like as another hetero atom together with the nitrogen atom.

Specifically, the divalent nitrogen-containing aromatic ring group may be a divalent group of a nitrogen-containing aromatic ring compound selected from the group consisting of pyrrole, thiazole, isothiazole, oxazole, isoxazole, imidazole, imidazole, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The first ion conductor and the second ion conductor may have a weight average molecular weight of 10,000 g/mol to 1,000,000 g/mol, and preferably a weight average molecular weight of 100,000 g/mol to 500,000 g/mol. When the weight average molecular weight of the first ion conductor and the second ion conductor is less than 100,000 g/mol, formation of a uniform film may be difficult and durability may be deteriorated. When the weight average molecular weight of the first ion conductor and the second ion conductor exceeds 500,000 g/mol, solubility may be deteriorated.

When the first ion conductor and the second ion conductor are hydrocarbon-based copolymers including hydrophilic repeating units and hydrophobic repeating units as illustrated above, the hybrid composite porous support is preferably a hydrocarbon-based hybrid composite porous support in terms of stability of the polymer electrolyte membrane. Specifically, when a hybrid composite porous support and an ion conductor having different properties are combined, for example, when a fluorine-based hybrid composite porous support and a hydrocarbon-based ion conductor are combined, the ion conductor may be easily detached or discharged from the hybrid composite porous support, or impregnation thereof may be deteriorated.

The first ion conductor and the second ion conductor may be prepared by preparing each of a hydrophilic repeating unit and a hydrophobic repeating unit, and then subjecting the hydrophilic repeating unit and the hydrophobic repeating unit to a nucleophilic substitution reaction.

In addition, the hydrophilic repeating unit and the hydrophobic repeating unit may also be prepared through a nucleophilic substitution reaction. For example, when the hydrophilic repeating unit is the repeating unit represented by Formula 2-2, it can be prepared through an aromatic nucleophilic substitution reaction between an active dihalide monomer and a dihydroxide monomer, two components constituting the repeating unit represented by Formula 2-2. When the hydrophobic repeating unit is the repeating unit represented by Formula 3-1, it can be prepared through an aromatic nucleophilic substitution reaction between an active dihalide monomer and a dihydroxide monomer, two components constituting the repeating unit represented by Formula 3-1.

For example, when the hydrophilic repeating unit is the repeating unit represented by Formula 2-2, it can be prepared through a nucleophilic substitution reaction between SDCDPS (sulfonated dichlorodiphenyl sulfone), SDFDPS (sulfonated difluorodiphenyl sulfone), SDCDPK (sulfonated dichlorodiphenyl ketone), DCDPS (dichlorodiphenyl sulfone), DFDPS (difluorodiphenyl sulfone or bis-(4-fluorophenyl)-sulfone), DCDPK (dichlorodiphenyl ketone) or the like, as the active dihalide monomer, and using SHPF (sulfonated 9,9'-bis(4-hydroxyphenyl)fluorine or sulfonated 4,4'-(9-fluorenylidene biphenol)), HPF (9,9'-bis(4-hydroxyphenyl)fluorine or 4,4'-(9-fluorenylidene biphenol)) or the like, as the active dihydroxy monomer.

In addition, when the hydrophobic repeating unit is the repeating unit represented by Formula 3-1, it may be prepared by a nucleophilic substitution reaction between 1,3-bis (4-fluorobenzoyl)benzene or the like as the active dihalide monomer and DHDPS (dihydroxydiphenyl sulfone), DHDPK (dihydroxydiphenyl ketone or dihydroxybenzophenone) or BP(4,4'-biphenol) as the active dihydroxy monomer.

In addition, when the hydrophobic repeating unit is the repeating unit represented by Formula 4-1, it may be prepared by a nucleophilic substitution reaction between 2,6-difluorobenzonitrile as the active dihalide monomer and DHDPS (dihydroxydiphenyl sulfone), DHDPK (dihydroxydiphenyl ketone or dihydroxybenzophenone) or BP(4,4'-biphenol) as the active dihydroxy monomer.

Similarly, even when the prepared hydrophilic repeating unit and the hydrophobic repeating unit are subjected to a nucleophilic substitution reaction, both end groups of the hydrophilic repeating unit may be set to hydroxy groups and both end groups of the hydrophobic repeating unit may be set to halide groups, or both end groups of the hydrophobic repeating unit may be set to hydroxy groups and both end groups of the hydrophilic repeating unit may be set to halide groups, so that the hydrophilic repeating unit and the hydrophobic repeating unit can be subjected to a nucleophilic substitution reaction.

At this time, the nucleophilic substitution reaction may be preferably carried out in the presence of an alkaline compound. The alkaline compound may be specifically sodium hydroxide, potassium hydroxide, sodium carbonate, potassium carbonate, sodium hydrogen carbonate or the like, and may be used alone or in combinations of two or more.

In addition, the nucleophilic substitution reaction may be carried out in a solvent. The solvent is specifically an aprotic polar solvent such as N,N-dimethyl acetamide, N,N-dimethyl formamide, N-methyl-2-pyrrolidone, dimethyl sulfoxide, sulfolane, or 1,3-dimethyl-2-imidazolidinone. These may be used alone or in combinations of two or more.

Here, the aprotic polar solvent may be present together with another solvent such as benzene, toluene, xylene, hexane, cyclohexane, octane, chlorobenzene, dioxane, tetrahydrofuran, anisole or phenetole.

Optionally, the method of the present disclosure may further include introducing an ion-conducting group into the first ion conductor and the second ion conductor. Two examples of introduction of the ion-conducting group into the ion conductor, in which the ion-conducting group is a cation-conducting group, specifically, a sulfonic acid group, are given below.

First, when preparing the hydrophilic repeating units of the first ion conductor and the second ion conductor, a monomer containing an ion-conducting group is polymerized to introduce the ion-conducting group into the prepared polymer prepared. In this case, as a monomer for the nucleophilic substitution reaction, SDCDPS (sulfonated dichlorodiphenyl sulfone), SDFDPS (sulfonated difluorodiphenyl sulfone), SDCDPK (sulfonated dichlorodiphenyl ketone), or SHPF (sulfonated 9,9'-bis(4-hydroxyphenyl) fluorine or sulfonated 4,4'-(9-fluorenylidene biphenol)), or the like, each of containing an ion-conducting group may be used.

In addition, in this case, a monomer having a sulfonic acid ester group, instead of the sulfonic acid group, is polymerized to prepare a polymer containing the sulfonic acid ester group, and then the sulfonic acid ester group is de-esterified to convert the sulfonic acid ester group to a sulfonic acid group.

Second, a polymer is prepared from a monomer containing no ion-conducting group, and is then sulfonated with a sulfonating agent to convert an ion-conducting group into the hydrophilic repeating unit.

The sulfonating agent may be sulfuric acid. In another embodiment, the prepared polymer is allowed to react in a chlorinated solvent such as dichloromethane, chloroform, or 1,2-dichloroethane in the presence of excess chlorosulfonic acid (1 to 10 times, preferably 4 to 7 times, the total weight of the polymer) to prepare an ion conductor having proton conductivity.

When the first ion conductor and the second ion conductor include sulfonic acid groups as ion-conducting groups, the ion conductor may have a sulfonation degree of 1 mol % to 100 mol %, preferably 50 mol % to 100 mol %. That is, 100 mol % of the ion conductor may be sulfonated at a site that can be sulfonated, and even when 100 mol % of the ion conductor is sulfonated, there is an effect in which dimensional stability and durability are not deteriorated due to the structure of the block copolymer of the ion conductor. In addition, when the ion conductor has a sulfidation degree within the above range, it can exhibit excellent ion conductivity without deteriorating dimensional stability.

In the case in which the first ion conductor and the second ion conductor include the hydrophilic repeating unit and the hydrophobic repeating unit, after the primary synthesis of the hydrophilic repeating unit and the hydrophobic repeating unit into oligomers, the hydrophilic repeating unit and the hydrophobic repeating unit are synthesized at a desired molar ratio, so that the structure can be easily controlled and the properties of the ion conductor can thereby be easily controlled. The structure-controlled ion conductor can provide an ion conductor having improved ion conductivity and durability at any humidity due to the fine phase separation of the hydrophilic repeating unit and the hydrophobic repeating unit.

Here, the molar ratio of the hydrophilic repeating unit to the hydrophobic repeating unit is expressed using the number of moles of the hydrophobic repeating unit per a mole of the hydrophilic repeating unit respectively included in the first ion conductor or the second ion conductor, and the first ion conductor and the second ion conductor may each independently have a molar ratio of the hydrophilic repeating unit to the hydrophobic repeating unit of 1:0.5 to 1:10, specifically 1:1 to 1:5, and more specifically 1:1.2 to 1:5. When the number of moles of the hydrophobic repeating unit per a mole of the hydrophilic repeating unit is less than 0.5, the water content may increase and thus dimensional stability and durability may decrease, and when the number of moles exceeds 10, a desired ionic conductivity performance may not be obtained.

Since the first ion conductor and the second ion conductor include different repeating units, the molar ratios of the hydrophilic repeating unit to the hydrophobic repeating unit thereof may be different from each other. Even when the first ion conductor and the second ion conductor include identical repeating units, the molar ratios of the hydrophilic repeating unit to the hydrophobic repeating unit thereof may be different from each other. That is, different performance characteristics can be imparted to the first ion conductor and the second ion conductor by setting different molar ratios of the hydrophilic repeating unit to the hydrophobic repeating unit for the first ion conductor and the second ion conductor.

In this case, the first ion conductor may be an ion conductor having a higher molar ratio of the hydrophilic repeating unit to the hydrophobic repeating unit than the molar ratio of the hydrophilic repeating unit to the hydrophobic repeating unit of the second ion conductor.

Specifically, the first ion conductor may have a molar ratio of the hydrophilic repeating unit to the hydrophobic repeating unit of 1:2 to 1:5, specifically 1:2 to 1:3, and the second ion conductor may have a molar ratio of the hydrophilic repeating unit to the hydrophobic repeating unit of 1:3 to 1:6, specifically 1:3 to 1:4. In this case, although the range of the molar ratio of the hydrophilic repeating unit to the hydrophobic repeating unit of the first ion conductor overlaps the range of that of the second ion conductor, the molar ratio of the hydrophilic repeating unit to the hydrophobic repeating unit of the first ion conductor may be higher than the molar ratio of the hydrophilic repeating unit to the hydrophobic repeating unit of the second ion conductor.

That is, when a polymer electrolyte membrane is produced using an ion conductor having a relatively high molar ratio of a hydrophilic repeating unit, like the first ion conductor, high ion conductivity can be realized.

When a polymer electrolyte membrane is produced using an ion conductor having a relatively high molar ratio of a hydrophobic repeating unit, like the second ion conductor, the polymer electrolyte membrane can exhibit reduced swelling and secure shape stability and durability.

Therefore, ionic conductivity can be improved and film resistance can be reduced by introducing the first ion conductor, having a relatively high molar ratio of a hydrophilic repeating unit, on one surface of the porous support, and the shape stability of the polymer electrolyte membrane can be secured by introducing the second ion conductor, having a relatively high molar ratio of a hydrophobic repeating unit, onto the other surface of the porous support.

Meanwhile, any one selected from the group consisting of the hybrid composite porous support, the first ion conductor layer and the second ion conductor layer may further include an antioxidant.

Since oxygen at the cathode of the polymer electrolyte fuel cell is reduced via hydrogen peroxide ($H_2O_2$), at the cathode, hydrogen peroxide may be produced or hydroxyl radicals (.$OH^-$) may be produced from the produced hydrogen peroxide. In addition, at the anode of the polymer electrolyte fuel cell, as an oxygen molecule penetrates the polymer electrolyte membrane, the hydrogen peroxide or hydroxyl radical may also be produced at the anode. The produced hydrogen peroxide or hydroxyl radical causes deterioration of the polymer containing sulfonic acid groups contained in the polymer electrolyte membrane or the catalyst layer.

Thus, any one selected from the group consisting of the hybrid composite porous support, the first ion conductor layer and the second ion conductor layer further includes an antioxidant capable of decomposing the peroxide or a radical, thereby inhibiting the generation of radicals from the peroxide or decomposing the generated radicals to prevent deterioration of the polymer electrolyte membrane or the catalyst layer to thereby improve the chemical durability of the polymer electrolyte membrane.

The antioxidant capable of decomposing peroxide or a radical is not particularly limited and any antioxidant can be used herein as long as it is capable of rapidly decomposing peroxide (particularly, hydrogen peroxide) or a radical (particularly, a hydroxyl radical) generated during the operation of the polymer electrolyte fuel cell. Specifically, for example, the antioxidant capable of decomposing peroxide or a radical may be a transition metal capable of decomposing the peroxide or radical, a noble metal capable of decomposing the peroxide or radical, an ion thereof, a salt thereof, or an oxide thereof.

Specifically, the transition metal capable of decomposing the peroxide or radical is any one selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), molybdenum (Mo), lanthanum (La) and neodymium (Nd).

In addition, the noble metal capable of decomposing the peroxide or radical may be any one selected from the group consisting of silver (Au), platinum (Pt), ruthenium (Ru), palladium (Pd) and rhodium (Rh).

In addition, the ion of the transition metal or the noble metal capable of decomposing the peroxide or radical may be any one selected from the group consisting of a cerium ion, a nickel ion, a tungsten ion, a cobalt ion, a chromium ion, a zirconium ion, an yttrium ion, a manganese ion, an iron ion, a titanium ion, a vanadium ion, a molybdenum ion, a lanthanum ion, a neodymium ion, a silver ion, a platinum ion, a ruthenium ion, a palladium ion and a rhodium ion. Specifically, for example, the cerium ion may be a cerium trivalent ion ($Ce^{3+}$) or a cerium tetravalent ion ($Ce^{4+}$).

In addition, the oxide of the transition metal or the noble metal capable of decomposing the peroxide or radical may be any one selected from the group consisting of cerium oxide, nickel oxide, tungsten oxide, cobalt oxide, chromium oxide, zirconium oxide, yttrium oxide, manganese oxide, iron oxide, titanium oxide, vanadium oxide, molybdenum oxide, lanthanum oxide, and neodymium oxide.

In addition, the salt of the transition metal or the noble metal capable of decomposing the peroxide or radical may be any one selected from the group consisting of carbonate, acetate, chloride, fluoride, sulfate, phosphate, tungstate, hydroxide, ammonium acetate, ammonium sulfate and acetylacetonate of the transition metal or the noble metal. Specifically, examples of such a salt of cerium include cerium carbonate, cerium acetate, cerium chloride, cerium acetate, cerium sulfate, diammonium cerium acetate, tetraammonium cerium sulfate and the like. Cerium acetylacetonate may be used as an organometallic complex salt.

However, in order to prevent deterioration of the polymer electrolyte membrane due to the radical, when the antioxidant capable of decomposing the peroxide or radical is dispersed in the polymer electrolyte membrane or the catalyst electrode, the antioxidant capable of decomposing the peroxide or radical is disadvantageously released during operation of the fuel cell.

Accordingly, in order to solve the problem of release of the antioxidant during the operation of the fuel cell, an organic second antioxidant capable of fixing the antioxidant may be included.

The organic second antioxidant may be a compound having a resonance structure based on a double bond of carboxylic acid, a hydroxy group and carbon. The organic second antioxidant having such a structure can prevent release based on unavailability of a release passage due to the large molecular size thereof compared to ion clusters and channels in the polymer electrolyte membrane, and hydrogen bonding between the carboxylic acid and hydroxyl groups in large amounts contained in the organic second antioxidant and the polymer in the polymer electrolyte membrane.

Specifically, for example, the organic second antioxidant may include any one selected from the group consisting of syringic acid, vanillic acid, protocatechuic acid, coumaric acid, caffeic acid, ferulic acid, chlorogenic acid, cynarine, gallic acid and mixtures thereof.

When the antioxidant includes both the first antioxidant and the second antioxidant, the second antioxidant may be present in an amount of 0 parts by weight to 200 parts by weight, specifically 30 parts by weight to 100 parts by weight, with respect to 100 parts by weight of the first antioxidant. When the content of the second antioxidant is less than 30 parts by weight, antioxidant activity is similar to that of use of the first antioxidant alone, and thus it is difficult to obtain the effect caused by the additional use of the second antioxidant, and when the content of the second antioxidant exceeds 200 parts by weight, uniformity of the polymer electrolyte membrane may be deteriorated due to low dispersibility with the polymer in the polymer electrolyte membrane.

The method for preparing a polymer electrolyte membrane according to another embodiment of the present disclosure comprises preparing a fluorine-based support having a plurality of pores formed by a microstructure of polymer fibrils, forming a nanoweb on one or both surfaces of the fluorine-based support by electrospinning, the nanoweb including nanofibers integrated into a nonwoven fabric having a plurality of pores, thereby producing a hybrid composite porous support, and filling the pores of the hybrid composite porous support with an ion conductor.

A fluorinated polymer having a plurality of pores due to the microstructure of polymer fibrils is prepared as follows. Specifically, a PTFE powder produced by dispersion polymerization is extruded into a rod-like paste in the presence of a lubricant such as Solvent naphtha or white oil, and the rod-like paste extrusion (cake) is rolled to produce an unsintered PTFE sheet. The unsintered PTFE sheet is elongated at a predetermined proportion in the machine direction (MD) and/or the transverse direction (TD). When the liquid lubricant, filled upon extrusion during elongation or after elongation, is removed by heating or extraction, an expanded PTFE sheet can be produced. In addition, the amorphous content of PTFE may be increased by heat-treating the expanded PTFE (e-PTFE) at a temperature exceeding the melting point of the PTFE (about 342° C.)

Then, a nanoweb is formed on one or both surfaces of the fluorine-based support are electrospun by electrospinning, the nanoweb including nanofibers integrated into a nonwoven fabric having a plurality of pores, thereby producing a hybrid composite porous support.

Specifically, the forming the nanoweb includes preparing an electrospinning solution and electrospinning the prepared electrospinning solution on one or both surfaces of the hybrid composite porous support.

First, the preparing the electrospinning solution includes preparing a solution containing a polymer for forming nanofibers through electrospinning. For example, the electrospinning solution may be prepared by mixing the polymer used for the nanofibers mentioned above with any one solvent selected from the group consisting of dimethylacetamide, N,N-dimethylformamide, dimethylsulphoxide, N-methyl-2-pyrrolidone, triethylphosphate, methylethylketone, tetrahydrofuran, acetone and a mixture thereof.

Next, the prepared electrospinning solution is electrospun to form a nanoweb including nanofibers integrated into a nonwoven fabric having a plurality of pores.

Figure 2:
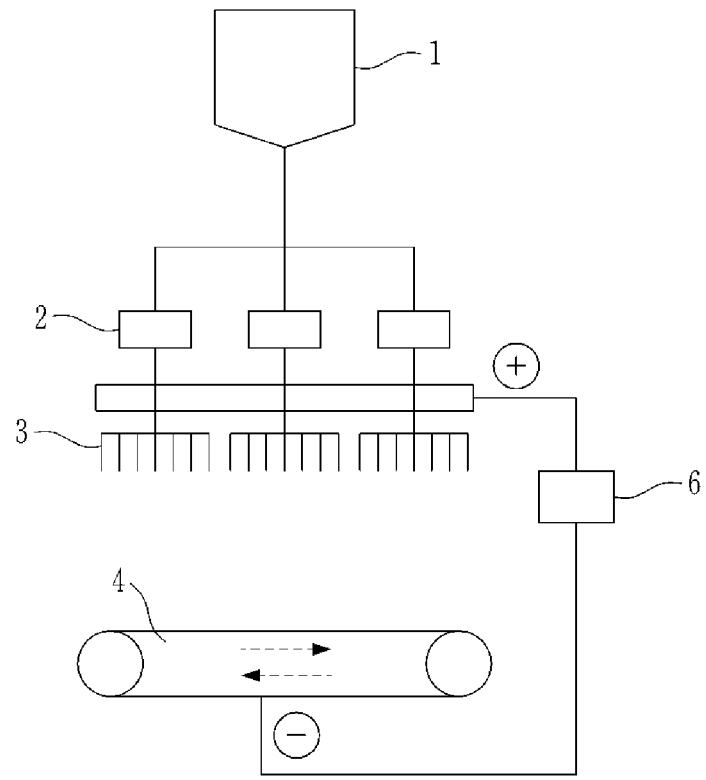
FIG. 2 is a schematic diagram of a nozzle-type electrospinner.

The electrospinning may be carried out using an electrospinner shown in FIG. 2. FIG. 2 is a schematic view illustrating a nozzle-type electrospinner. Referring to FIG. 2, the electrospinning is performed by supplying an electrospinning solution to a plurality of nozzles 3 or spinnerets, to which a high voltage is applied using a high voltage generator 6, using a metering pump 2 in a solution tank 1 in which the electrospinning solution is stored. At this time, the electrospinning solution forms a jet due to the difference in electrical energy, that is, the difference in voltage between the tip of the nozzle 3 or the spinneret and an integration unit 4, and is then transported. The formed jet is whipped and stretched by an electric field and is thus made thinner, and the solvent is vaporized so that solid fibers are integrated in the integration unit 4.

Meanwhile, when the nanofibers constituting the nanoweb are polyimide, the nanoweb may be prepared by electrospinning polyamic acid (PAA) to form a nanoweb precursor including PAA nanofibers, followed by subsequent heat treatment or chemical imidization.

Then, the pores of the hybrid composite porous support are filled with the ionic conductor.

The filling the pores of the hybrid composite porous support with the ion conductor may be carried out by supporting or impregnating the hybrid composite porous support in a solution containing the ion conductor.

Specifically, the filling the pores of the hybrid composite porous support with the ion conductor includes forming a first ion conductor layer including a first ion conductor on one surface of the hybrid composite porous support and forming a second ion conductor layer including a second ion conductor on the other surface of the hybrid composite porous support.

More specifically, the pores in one surface of the hybrid composite porous support are filled with the first ion conductor, the residue of the first ion conductor left after filling the pores in one surface of the hybrid composite porous support is used to form the first ion conductor layer on one surface of the hybrid composite porous support, the pores in the other surface of the hybrid composite porous support are filled with the second ion conductor, and the residue of the second ion conductor left after filling the pores in the other surface of the hybrid composite porous support is used to form the second ion conductor layer.

However, the present disclosure is not limited thereto. That is, after the first ion conductor layer is formed by filling the pores of the hybrid composite porous support with only the first ion conductor, the second ion conductor layer may be formed with only the second ion conductor on the other surface of the hybrid composite porous support, or vice versa.

The filling the pores of the hybrid composite porous support with the first ion conductor and the second ion conductor may be carried out generally by supporting or impregnating the hybrid composite porous support in a solution containing the first ion conductor or the second ion conductor. In addition, the filling the pores of the hybrid composite porous support with the first ion conductor and the second ion conductor may be carried out by any one method selected from the group consisting of bar coating, comma coating, slot die, screen printing, spray coating, doctor-blade coating, laminating and a combination thereof.

That is, the method of producing the polymer electrolyte membrane may be carried out in the same manner as a conventional process except that the one surface and the other surface of the hybrid composite porous support are respectively filled with the first ion conductor and the second ion conductor.

The first ion conductor and the second ion conductor may fill the hybrid composite porous support in the form of a solution or dispersion containing the same. The solution or dispersion containing the first ion conductor or the second ion conductor may be a commercially available ion conductor solution or dispersion, and may be prepared by dispersing the first ion conductor or the second ion conductor in a solvent. The method of dispersing the first ion conductor or the second ion conductor in a solvent may be a conventionally known method, and thus a detailed description thereof will be omitted.

In this case, the antioxidant may be further added to the solution or dispersion containing the first ion conductor or the second ion conductor. When the antioxidant is added only to the solution or dispersion containing the first ion conductor, the antioxidant may be incorporated only into the first ion conductor layer, or may be incorporated into a portion of the hybrid composite porous support as well. In addition, by controlling the content of the antioxidant that is added to the solution or dispersion containing the first ion conductor or the second ion conductor, the content of the antioxidant with respect to 100 parts by weight of the ion conductor in the hybrid composite porous support, the first ion conductor layer or the second ion conductor layer can be controlled.

The solvent for preparing a solution or dispersion containing the first ion conductor or the second ion conductor may include at least one selected from the group consisting of water, a hydrophilic solvent, an organic solvent and a mixture thereof.

The hydrophilic solvent has at least one functional group selected from the group consisting of alcohol, isopropyl alcohol, ketone, aldehyde, carbonate, carboxylate, carboxylic acid, ether and amide, containing, as a main chain, a straight-chain or branched-chain, saturated or unsaturated hydrocarbon having 1 to 12 carbon atoms. These may contain an alicyclic or aromatic cyclic compound as at least a part of the main chain.

The organic solvent may be selected from N-methylpyrrolidone, dimethyl sulfoxide, tetrahydrofuran and a mixture thereof.

In addition, the filling the pores of the hybrid composite porous support with the first ion conductor or the second ion conductor may be affected by various factors such as temperature and time. For example, the filling step may be affected by the thickness of the hybrid composite porous support, the concentration of the solution or dispersion containing the first ion conductor or the second ion conductor, and the type of solvent. The process may be performed at a temperature of the freezing point of the solvent to 100° C., and more generally, may be performed at a temperature of room temperature (20° C.) to 70° for about 5 to 30 minutes. However, the temperature must not be higher than the melting point of the hybrid composite porous support.

The method of producing the polymer electrolyte membrane may further include producing a plurality of hybrid composite porous supports including the hybrid composite porous support including the first ion conductor and the second ion conductor and stacking the plurality of hybrid composite porous supports.

The stacking of the hybrid composite porous supports may be performed using a laminating method, and, as described above, a polymer electrolyte membrane with high efficiency can be produced while easily adjusting the thickness ratio required for the fuel cell by stacking the hybrid composite porous supports.

According to another embodiment of the present disclosure, provided are a membrane-electrode assembly including the polymer electrolyte membrane and a fuel cell including the same.

Specifically, the membrane-electrode assembly includes an anode and a cathode facing each other, and the polymer electrolyte membrane located between the anode and the cathode.

Figure 3:
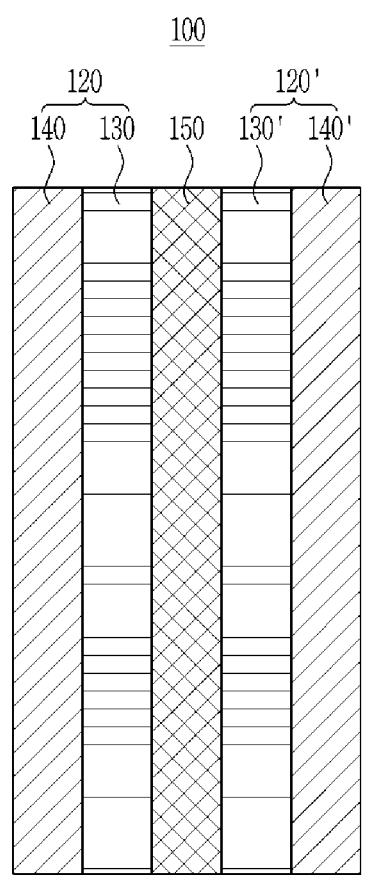
FIG. 3 is a schematic cross-sectional view showing a membrane-electrode assembly according to an embodiment of the present disclosure.

FIG. 3 is a schematic sectional view showing a membrane-electrode assembly according to an embodiment of the present disclosure. Referring to FIG. 3, the membrane-electrode assembly 100 includes a polymer electrolyte membrane 150 and electrodes for fuel cells 120 and 120' disposed on both surfaces of the polymer electrolyte membrane 150. The electrodes include electrode substrates 140 and 140' and catalyst layers 30 and 30' formed on the surface of the electrode substrates 140 and 140', and may further include a microporous layer (not shown) including conductive fine particles such as carbon powder and carbon black to facilitate material diffusion in the electrode substrates 140 and 140' between the electrode substrates 140 and 140' and the catalyst layers 30 and 30'.

In the membrane-electrode assembly 100, the electrode 120 that is disposed on one surface of the polymer electrolyte membrane 150 and causes an oxidation reaction to generate hydrogen ions and electrons from fuel transferred through the electrode substrate 140 to the catalyst layer 130 is referred to as an "anode", and the electrode that is disposed on the other surface of the polymer electrolyte membrane 150 and causes a reduction reaction to generate water from the hydrogen ions supplied through the polymer electrolyte membrane 150 and an oxidizing agent transferred through the electrode substrate 140' to the catalyst layer 130' is referred to as a "cathode".

The catalyst layers 130 and 130' of the anode 120 and the cathode 120' include the catalyst. Any catalyst can be used, as long as it participates in the reaction of the battery and can be used as a catalyst for a fuel cell. Specifically, the catalyst is preferably a platinum-based metal.

The platinum-based metal may include at least one selected from the group consisting of platinum (Pt), palladium (Pd), ruthenium (Ru), iridium (Ir), osmium (Os), platinum-M alloy (wherein M includes at least one selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La) and rhodium (Rh)), non-platinum alloys and combinations thereof, more preferably a combination of two or more metals selected from the group of platinum-based catalyst metals, but the present disclosure is not limited thereto, and any platinum-based catalyst metal that is available for use in the art may be used without limitation.

Specifically, the platinum alloy may be one or a combination of two or more selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir and combinations thereof.

Specifically, the non-platinum alloy may be one or a combination of two or more selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os and combinations thereof.

The catalyst may be used as a catalyst (black) or a support on a carrier.

The carrier may be selected from carbon-based carriers, porous inorganic oxides such as zirconia, alumina, titania, silica, ceria, zeolite and the like. The carbon-based carrier may be selected from graphite, super P, carbon fiber, a carbon sheet, carbon black, Ketjen black, Denka black, acetylene black, carbon nanotubes (CNTs), carbon spheres, carbon ribbon, fullerene, activated carbon, carbon nanofibers, carbon nanowires, carbon nanoballs, carbon nanohorns, carbon nanocages, carbon nanorings, ordered nano-/meso-porous carbon, carbon aerogels, mesoporous carbon, graphene, stabilized carbon, activated carbon and combinations thereof, but the present disclosure is not limited thereto, and any carrier usable in the art can be used without limitation.

The catalyst particles may be located on the surface of the carrier, or may penetrate into the carrier while filling the pores of the carrier.

When the noble metal supported on the carrier is used as the catalyst, it may be a commercially available product, or may be prepared by supporting a noble metal on the carrier. The process of supporting the noble metal on the carrier is widely known in the art, and will be easily understood by those skilled in the art and thus a detailed description is omitted herein.

The catalyst particles may be present in an amount of 20% to 80% by weight with respect to the total weight of the catalyst layers 130 and 130'. When the catalyst particles are present in an amount of less than 20% by weight, there may be a problem of deterioration in activity, and when the content exceeds 80% by weight, the active area may decrease due to the aggregation of the catalyst particles, and thus the catalytic activity may be deteriorated.

In addition, the catalyst layers 130 and 130' may include a binder for improving adhesion of the catalyst layers 130 and 130' and transferring hydrogen ions. The binder is preferably an ion conductor having ionic conductivity, and the description of the ion conductor is as above, and thus a repeated description thereof is omitted.

However, the ion conductor may be used in the form of a single substance or a mixture, and may optionally be used together with a non-conductive compound for the purpose of further improving adhesion with the polymer electrolyte membrane 150. The amount that is used can be adjusted depending on the intended use.

The non-conductive compound may include at least one selected from the group consisting of polytetrafluoroethylene (PTFE), tetrafluoroethylene-hexafluoropropylene copolymer (FEP), tetrafluoroethylene-perfluoroalkyl vinyl ether copolymer (PFA), ethylene/tetrafluoroethylene (ETFE), ethylene chlorotrifluoro-ethylene copolymer (ECTFE), polyvinylidene fluoride, polyvinylidene fluoride-hexafluoropropylene copolymer (PVdF-HFP), dodecylbenzenesulfonic acid and sorbitol.

The binder may be present in an amount of 20% to 80% by weight with respect to the total weight of the catalyst layers 130 and 130'. When the content of the binder is less than 20% by weight, the produced ions may not be delivered well, and when the content exceeds 80% by weight, it is difficult to supply hydrogen or oxygen (air) due to the insufficient number of pores, and the size of the active area on which a reaction is possible may be reduced.

Each of the electrode substrates 140 and 140' may be a porous conductive substrate to smoothly supply hydrogen or oxygen. Typical examples thereof include a carbon paper, a carbon cloth, a carbon felt or a metal cloth (referring to a porous film including a fibrous metal fabric or a polymer fiber fabric having a metal film formed on the surface thereof), but the present disclosure is not limited thereto. In addition, the electrode substrates 140 and 140' are preferably treated with a fluoro-based resin so as to be water-repellent and to prevent deterioration of diffusion efficiency due to water generated during the operation of the fuel cell. The fluoro-based resin may include polytetrafluoroethylene, polyvinylidene fluoride, polyhexafluoropropylene, polyperfluoroalkyl vinyl ether, polyperfluorosulfonylfluoride-alkoxyvinyl ether, fluorinated ethylene propylene, polychlorotrifluoroethylene, or copolymers thereof.

A microporous layer may be further added to increase the diffusion effect of reactants of the electrode substrates 140 and 140'. The microporous layer generally includes a conductive powder with a small particle diameter, for example, a carbon powder, carbon black, acetylene black, activated carbon, carbon fiber, fullerene, carbon nanotubes, carbon nanowires, carbon nanohorns or carbon nanorings.

The microporous layer is formed by coating a composition, including a conductive powder, a binder resin and a solvent, on the electrode substrate 140 or 140'. The binder resin is preferably polytetrafluoroethylene, polyvinylidene fluoride, polyhexafluoropropylene, polyperfluoroalkyl vinyl ether, polyperfluorosulfonyl fluoride, alkoxyvinyl ether, polyvinyl alcohol, cellulose acetate or a copolymer thereof. The solvent is preferably an alcohol such as ethanol, isopropyl alcohol, n-propyl alcohol or butyl alcohol, water, dimethylacetamide, dimethylsulfoxide, N-methylpyrrolidone, tetrahydrofuran or the like. The coating process may include, but is not limited to, screen printing, spray coating, doctor-blade coating or the like.

The membrane-electrode assembly 100 can be manufactured in accordance with the method of manufacturing a membrane-electrode assembly for a fuel cell, except that the polymer electrolyte membrane 150 according to the present disclosure is used as the polymer electrolyte membrane 150.

The fuel cell according to one embodiment of the present disclosure includes the membrane-electrode assembly 100 described above.

Figure 4:
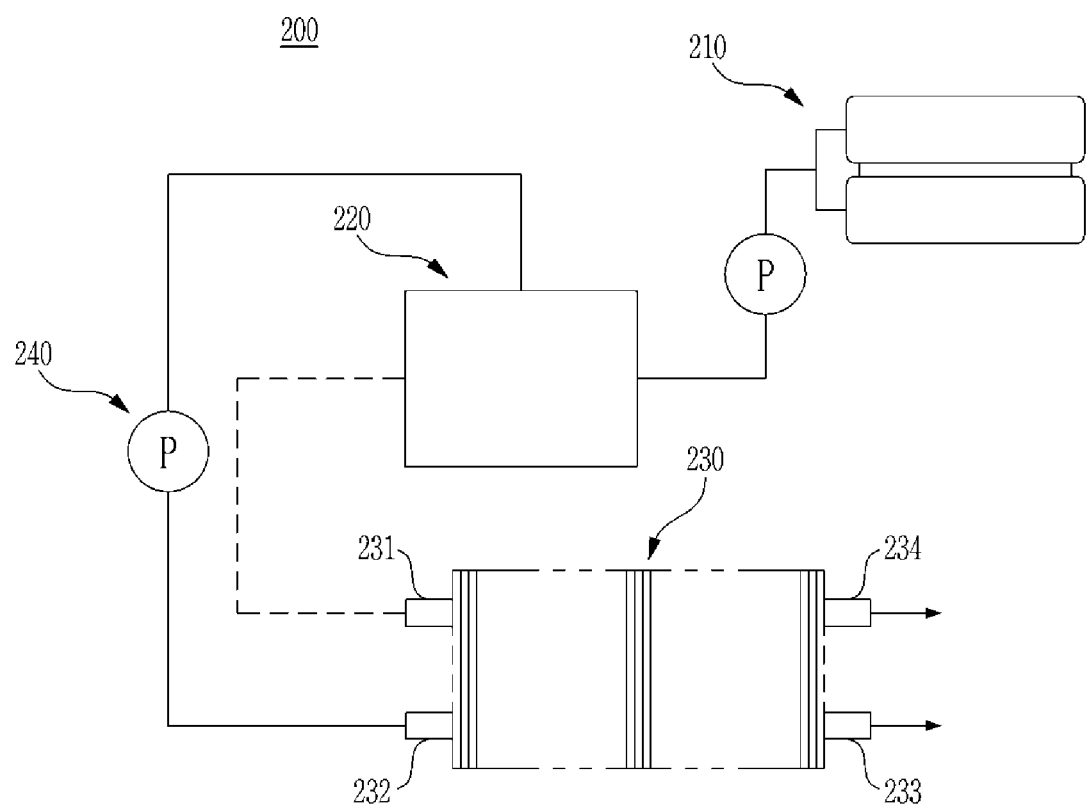
FIG. 4 is a schematic diagram showing the overall configuration of a fuel cell according to an embodiment of the present disclosure.

FIG. 4 is a schematic diagram showing the overall configuration of the fuel cell.

Referring to FIG. 4, the fuel cell 200 includes a fuel feeder 210 for feeding a fuel mixture of a fuel and water and a reformer 220 for reforming the fuel mixture to generate a reforming gas including hydrogen gas, a stack 230 for generating electrical energy through electrochemical reaction between an oxidizing agent and the reforming gas including hydrogen gas supplied from the reformer 220, and an oxidizing agent feeder 240 for feeding the oxidizing agent to the reformer 220 and the stack 230.

The stack 230 includes a plurality of unit cells for generating electrical energy by inducing an oxidation/reduction reaction between the reforming gas including hydrogen gas supplied from the reformer 220 and the oxidizing agent supplied from the oxidizing agent feeder 240.

Each unit cell refers to a cell of a unit for generating electricity, and includes a membrane-electrode assembly for oxidizing/reducing oxygen in the oxidizing agent and the reforming gas including hydrogen gas, and a separator plate (also called a "bipolar plate") for feeding the reforming gas including hydrogen gas and the oxidizing agent to the membrane-electrode assembly. The separator plates are disposed on both sides of the membrane-electrode assembly. At this time, the separator plates respectively located at the outermost positions of the stack may be specifically referred to as "end plates".

One end plate of the separator plate includes a pipe-shaped first supply tube 231 for injecting the reforming gas including hydrogen gas supplied from the reformer 220 and a pipe-shaped second supply tube 232 for injecting oxygen gas, and the other end plate of the separator plate includes a first discharge tube 233 for discharging the remaining unreacted reforming gas including hydrogen gas in the plurality of unit cells to the outside and a second discharge tube 234 for discharging the remaining unreacted oxidizing agent in the unit cell described above to the outside.

The separator, the fuel feeder and the oxidant feeder constituting the electricity generator in the fuel cell are the same as those used in a conventional fuel cell except for the membrane-electrode assembly 100 according to an embodiment of the present disclosure, and thus a detailed description thereof is omitted herein.

MODE FOR DISCLOSURE

Hereinafter, examples of the present disclosure will be described in more detail such that they can be easily implemented by those skilled in the field to which the present disclosure pertains. However, the present disclosure can be implemented as various embodiments and are not limited to the examples described herein.

Production Example 1: Preparation of Ion Conductor

Production Example 1-1

1) Preparation of Hydrophobic Repeating Units

As shown in Reaction Scheme 3 below, bisphenol A was reacted with 1,3-bis(4-fluorobenzoyl)benzene at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

[Reaction Scheme 3]

1.
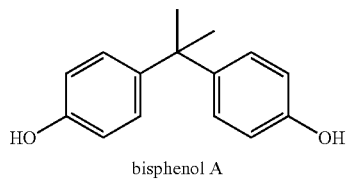
bisphenol A

2.
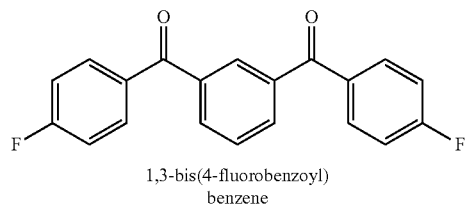
1,3-bis(4-fluorobenzoyl) benzene

3.
K$_2$CO$_3$
Molecular Weight: 138.21
Potassium carbonate

DMAc (20% solution concentration)
Toluene

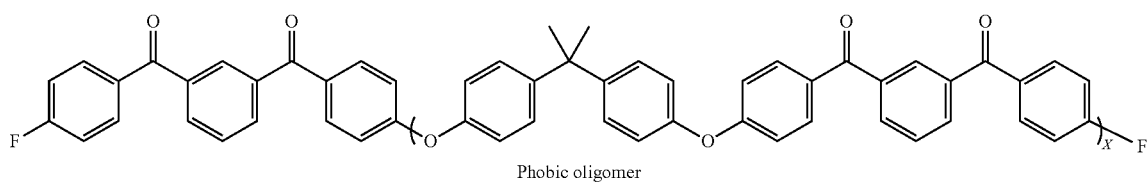
Phobic oligomer

2) Preparation of Hydrophilic Repeating Units

As shown in Reaction Scheme 4 below, 4,4'-(9-fluorenyliene)diphenol was reacted with bis(4-fluorophenyl)sulfone at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

[Reaction Scheme 4]

1.
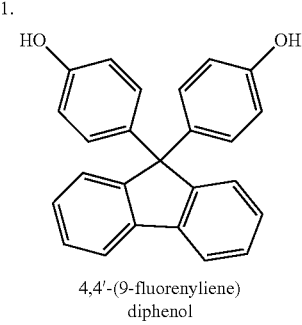
4,4'-(9-fluorenyliene) diphenol

2.
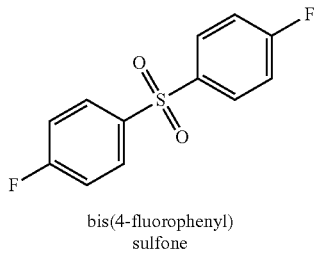
bis(4-fluorophenyl) sulfone

3.
K$_2$CO$_3$
Potassium carbonate

DMAc (20% solution concentration)
Toluene

-continued

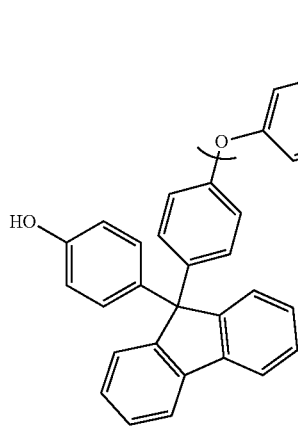

Philic oligomer

3) Preparation of Polymer

The prepared hydrophobic repeating unit was reacted with the prepared hydrophilic repeating unit at 160 to 180° C. for 30 hours using a co-solvent of DMAc/toluene in the presence of potassium carbonate, and the resulting reaction solution was washed with purified water and then hot-air dried. The molar ratio of hydrophilic repeating unit:hydrophobic repeating unit of the prepared polymer was 1:3.5.

4) Preparation of Ion Conductor

The prepared polymer was dissolved in dichloromethane, and the resulting solution was slowly added to a 5-times excess of chlorosulfonic acid/DCM solution, followed by stirring for 24 hours. The solution was removed, the precipitated solid was washed with distilled water, and the residue was air-dried.

Production Example 1-2

An ion conductor was produced in the same manner as in Production Example 1-1, except that the polymer was prepared in Production Example 1-1, such that the molar ratio of hydrophilic repeating unit:hydrophobic repeating unit was 1:2.5.

Production Example 1-3

1) Preparation of Hydrophobic Repeating Units

As shown in Reaction Scheme 5 below, 4,4'-dihydroxybenzophenone was reacted with 2,6-difluorobenzonitrile at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

[Reaction Scheme 5]

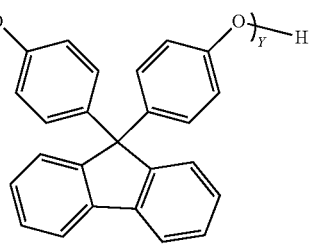

4,4'-dihydroxybenzophenone 2,6-difluorobenzonitrile

3.
K$_2$CO$_3$
Molecular Weight: 138.21
Potassium carbonate

DMAc (20% solution concentration)
Toluene

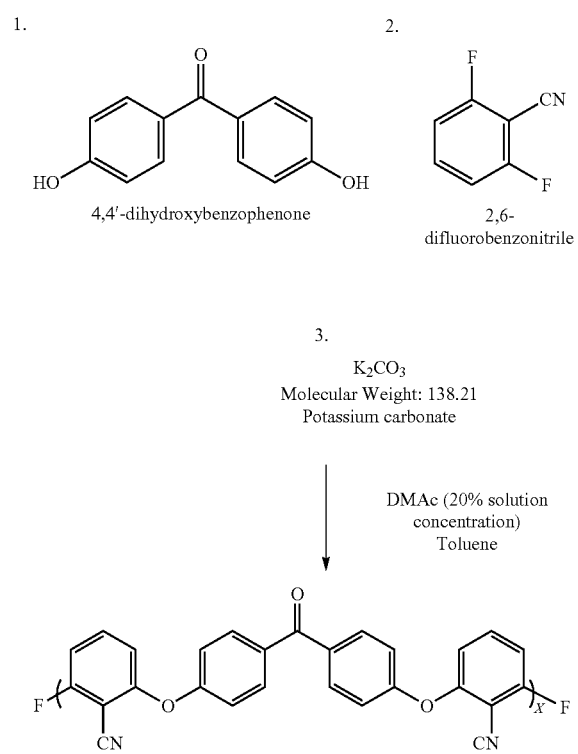

2) Preparation of Hydrophilic Repeating Units

As shown in Reaction Scheme 6 below, 4,4'-(9-fluorenyliene)diphenol was reacted with bis(4-fluorophenyl)sulfone at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

[Reaction Scheme 6]

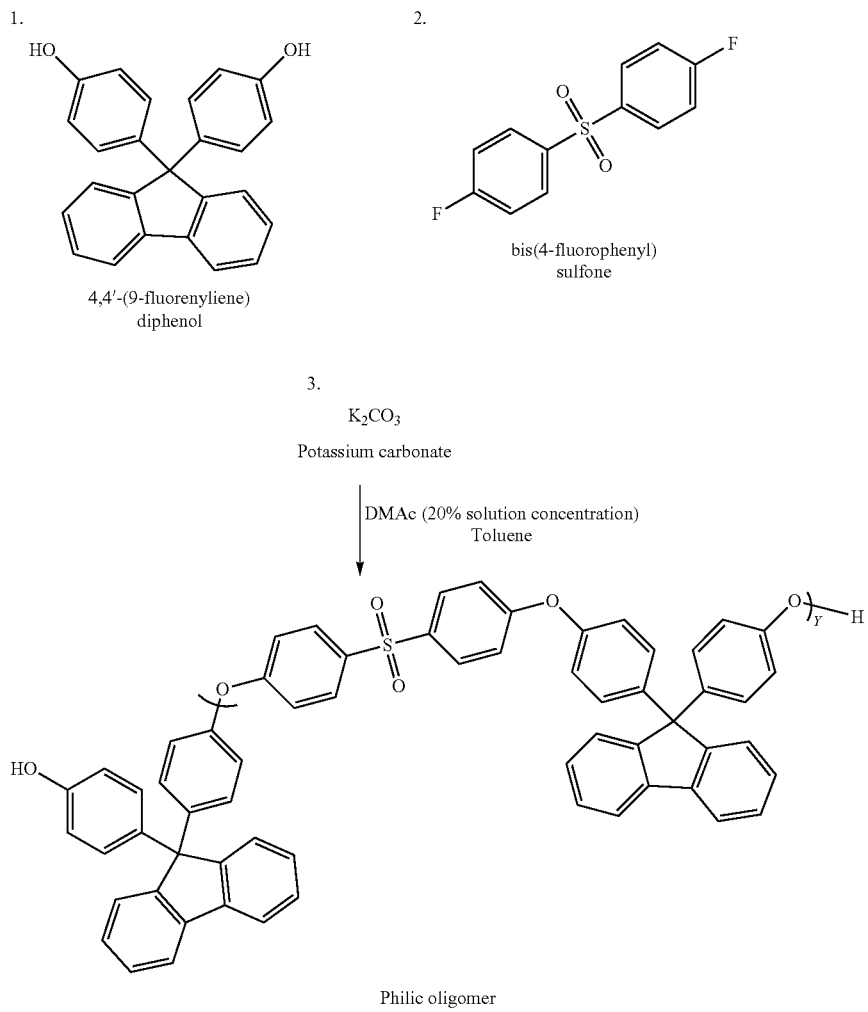

Philic oligomer

3) Preparation of Polymer

The prepared hydrophobic repeating unit was reacted with the prepared hydrophilic repeating unit at 160 to 180° C. for 30 hours using a co-solvent of DMAc/toluene in the presence of potassium carbonate, and the resulting reaction solution was washed with purified water and then hot-air dried. The molar ratio of hydrophilic repeating unit (Y): hydrophobic repeating unit (X) of the prepared polymer was 1:3.5.

4) Preparation of Ion Conductor

The prepared polymer was dissolved in dichloromethane and the resulting solution was slowly added to a 5-times excess of chlorosulfonic acid/DCM solution, followed by stirring for 24 hours. The solution was removed, the precipitated solid was washed with distilled water, and the residue was air-dried.

Production Example 1-4

An ion conductor was produced in the same manner as in Production Example 1-3, except that the polymer was prepared in Production Example 1-3, such that the molar ratio of the hydrophilic repeating unit:hydrophobic repeating unit was 1:2.5.

Production Example 1-5

1) Preparation of Hydrophobic Repeating Units 4,4'-dihydroxybenzophenone was reacted with bis(4-fluorophenyl)sulfone at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

2) Preparation of Hydrophilic Repeating Units 4,4'-(9-fluorenyliene)diphenol was reacted with 1,3-bis(4-fluorobenzoyol)benzene at 160 to 180° C. for 30 hours using a co-solvent of DMAc/toluene in the presence of potassium carbonate, and the resulting reaction solution was washed with purified water and then hot-air dried. At this time, the Carothers equation was used to control the degree of polymerization of the oligomer.

3) Preparation of Polymer

The prepared hydrophobic repeating unit was reacted with the prepared hydrophilic repeating unit at 160 to 180° C. for 30 hours using a co-solvent of DMAc/toluene in the presence of potassium carbonate, and the resulting reaction solution was washed with purified water and then hot-air dried to prepare the polymer represented by Formula 7 below. The molar ratio of hydrophilic repeating unit (X): hydrophobic repeating unit (Y) of the prepared polymer was 1:3.5.

[Formula 7]

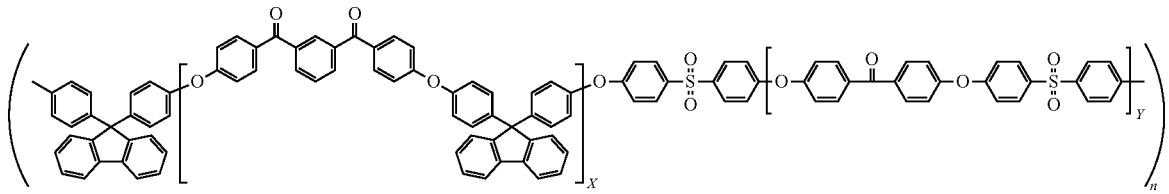

4) Preparation of Ion Conductor

The prepared polymer was dissolved in dichloromethane, and the resulting solution was slowly added to a 5-times excess of chlorosulfonic acid/DCM solution, followed by stirring for 24 hours. The solution was removed, the precipitated solid was washed with distilled water, and the residue was air-dried.

Production Example 1-6

An ion conductor was produced in the same manner as in Production Example 1-5, except that the polymer was prepared in Production Example 1-5 such that the molar ratio of hydrophilic repeating unit:hydrophobic repeating unit was 1:2.5.

Production Example 2: Preparation of Hybrid Composite Porous Support

Production Example 2-1

A PTFE porous support was prepared as a fluorinated polymer having a plurality of pores due to the fine structure of polymer fibrils.

Meanwhile, polyamic acid was dissolved in dimethylformamide to prepare 5 L of an electrospinning solution (480 poise).

The electrospinning solution was electrospun on both sides of the PTFE porous support under the conditions of a voltage of 3 kV and a discharge amount of 1.5 ml/min using the electrospinner of FIG. 2 to prepare a nanoweb precursor. The prepared nanoweb precursor was heat-treated at 350° C. to prepare a hybrid composite porous support (porosity: 40% by volume).

Production Example 2-2

A PTFE porous support was prepared as a fluorinated polymer having a plurality of pores due to the microstructure of polymer fibrils.

Meanwhile, PVdF was dissolved in dimethylacetamide to prepare an electrospinning solution. The electrospinning solution had a viscosity of 3,000 cP.

The electrospinning solution was electrospun on both sides of the PTFE porous support under the conditions of a voltage of 60 kV and a discharge amount of 20 cc/min using the electrospinner of FIG. 2 to prepare a hybrid composite porous support.

Comparative Production Example 2-1

Polyamic acid was dissolved in dimethylformamide to prepare 5 L (480 poise) of a spinning solution. The prepared spinning solution was transferred to a solution tank and supplied to and spun in a spinning chamber having 20 nozzles and an applied high voltage of 3 kV through a metering gear pump to prepare a nanofiber precursor web. At this time, the solution supply amount was 1.5 ml/min. The prepared nanofiber precursor web was heat-treated at 350° C. to produce a porous support (porosity: 80 vol %).

The polyimide nanofibers of the porous support had a weight per unit area of 6.8 gsm.

Comparative Production Example 2-2

A nanoweb was produced by electrospinning in the same manner as in Comparative Production Example 2-1, except that two nanowebs having a thickness equal to half that of the nanoweb prepared in Comparative Production Example 2-1 were produced and then the two nanowebs were stacked to produce a porous support.

Comparative Production Example 2-3

Two PTFE porous supports having a thickness equal to half that of the PTFE porous support prepared in Production Example 2-2 were prepared, and then the two PTFE porous supports were stacked to produce a porous support.

Example 1: Production of Polymer Electrolyte Membrane

Example 1-1

Each of the ion conductor having a molar ratio of the hydrophilic repeating unit:hydrophobic repeating unit of 1:3.5 produced in Production Example 1-1 and the ion conductor having a molar ratio of the hydrophilic repeating unit:hydrophobic repeating unit of 1:2.5 produced in Production Example 1-2 was dissolved in DMAc at 20% by weight to prepare an ion conductor solution.

Then, one and the other surfaces of the hybrid composite porous support produced in Production Example 2-1 was impregnated with the ion conductor solutions prepared in Production Example 1-1 and Production Example 1-2, respectively, to produce a polymer electrolyte membrane.

Specifically, the impregnation method was carried out by first impregnating the ion conductor having a relatively high molar ratio of the hydrophilic repeating unit produced in Production Example 1-2 on one surface based on the hybrid composite porous support to fill the pores in one surface of the hybrid composite porous support to thereby form a first ion conductor layer on the surface of the hybrid composite porous support, and then impregnating the ion conductor having a relatively high molar ratio of the hydrophobic repeating unit produced in Production Example 1-1 on the other surface of the hybrid composite porous support to fill the pores in the other surface of the hybrid composite porous support and thereby form a second ion conductor layer on the other surface of the hybrid composite porous support.

Impregnation was conducted on each surface for 30 minutes, the resulting structure was allowed to stand at reduced pressure for one hour and dried under vacuum at 80° C. for 10 hours to produce a polymer electrolyte membrane.

At this time, the weight of the ion conductor was 65 mg/cm$^2$. In addition, the proportion (percentage) of the thickness of the first ion conductor prepared in Production Example 1-2, having a relatively high molar ratio of the hydrophilic repeating unit, with respect to the total thickness of the produced polymer electrolyte membrane was 70%, and the proportion (percentage) of the thickness of the second ion conductor prepared in Production Example 1-1, having a relatively high molar ratio of the hydrophobic repeating unit, with respect to the total thickness of the prepared polymer electrolyte membrane was 30%. At this time, the thickness proportion is the sum of the thickness of the ion conductor layer formed on the surface of the hybrid composite porous support and the thickness of the ion conductor layer impregnated in the hybrid composite porous support.

Example 1-2 and Example 1-3

A polymer electrolyte membrane was produced in the same manner as in Example 1-1, except that, in Example 1-1, the ion conductors prepared in Production Example 1-3 and Production Example 1-4 and the ion conductors prepared in 1-5 and Production Example 1-6 were used, instead of the ion conductors prepared in Production Example 1-1 and Production Example 1-2.

Comparative Example 1-1

The porous support prepared in Comparative Production Example 2-1 was impregnated twice for 30 minutes in the ion conductor solution prepared by dissolving the ion conductor produced in Production Example 1-1 at 20% by weight in DMAc, allowed to stand under reduced pressure for 1 hour and dried under vacuum at 80° C. for 10 hours to produce a polymer electrolyte membrane. At this time, the weight of the ion conductor was 65 mg/cm$^2$.

Comparative Example 1-2

The porous support produced in Comparative Production Example 2-1 was impregnated twice for 30 minutes in the ion conductor solution prepared by dissolving the ion conductor produced in Production Example 1-2 at 20% by weight in DMAc, allowed to stand under reduced pressure for 1 hour, and dried under vacuum at 80° C. for 10 hours to produce a polymer electrolyte membrane. At this time, the weight of the ion conductor was 65 mg/cm$^2$.

Comparative Example 1-3

A polymer electrolyte membrane was produced in the same manner as in Example 1-1, except that, in Example 1-1, the hybrid composite porous support prepared in Comparative Production Example 2-2 was used, instead of the hybrid composite porous support prepared in Production Example 2-1.

Comparative Example 1-4

A polymer electrolyte membrane was produced in the same manner as in Example 1-1, except that, in Example 1-1, the hybrid composite porous support prepared in Comparative Production Example 2-3 was used, instead of the hybrid composite porous support prepared in Production Example 2-1.

Experimental Example 1: Measurement of Properties of Produced Ion Conductors

The ion exchange capacity (IEC) of the polymer electrolyte membranes prepared in Comparative Examples 1-1 and 1-2 were evaluated through neutralization titration. In addition, ion conductivity and dimensional stability were measured under conditions of 80° C., 95% relative humidity, and 80° C. and 50% relative humidity, respectively. The results are shown in Table 1 below.

The ion conductivity was calculated by measuring the membrane resistance of the membrane in 1M $H_2SO_4$.

The resistance of the membrane was calculated using the following Equation 3 below, wherein the effective area of the membrane was 0.75 cm$^2$.

$$\text{Membrane resistance } (R)=(R_1-R_2)\times(\text{effective area of membrane}) \quad \text{[Equation 3]}$$

wherein $R_1$ is the resistance [0] when the membrane is injected and $R_2$ is the resistance [0] when the membrane is not injected.

The ion conductivity was calculated using the following Equation 4:

$$\text{Ion conductivity (S/cm)}=1/R\times t \quad \text{[Equation 4]}$$

wherein R is a membrane resistance [$\Omega\cdot cm^2$] and t is a membrane thickness [cm].

The dimensional stability was measured as follows.

The produced polymer electrolyte membrane was immersed in distilled water at 80° C. for 24 hours, the thickness and area of the wet polymer electrolyte membrane were measured, the polymer electrolyte membrane was dried under vacuum at 80° C. for 24 hours, the thickness and area thereof were measured, and the wet thickness ($T_{wet}$) and wet area ($L_{wet}$) and the dry thickness ($T_{dry}$) and the dry area ($L_{dry}$) of the polymer electrolyte membrane were applied to the following Equations 5 and 6 to determine a thickness swelling ratio and an area swelling ratio.

$$(T_{wet}-T_{dry}/T_{dry})\times 100=\Delta T \text{ (thickness swelling ratio, \%)} \quad \text{[Equation 5]}$$

$$(L_{wet}-L_{dry}/L_{dry})\times 100=\Delta L \text{ (area swelling ratio, \%)} \quad \text{[Equation 6]}$$

TABLE 1

| | Molar ratio of hydrophilic: hydrophobic | Membrane thickness (μm) | IEC | Weight average molecular weight (Mw) | Water content (%) | Conductivity (S/cm) RH 95% | Conductivity (S/cm) RH 50% | Dimensional stability (%) ΔL | Dimensional stability (%) ΔT |
|---|---|---|---|---|---|---|---|---|---|
| Comp. Ex. 1-1 | 1:3.5 | 22~23 | 1.65 | 150000 | 26 | 0.14 | 0.018 | 3.9 | 16 |
| Comp. Ex. 1-2 | 1:2.5 | 22~23 | 1.8 | 160000 | 30 | 0.17 | 0.019 | 3.9 | 20 |

As shown in Table 1, the polymer electrolyte membranes produced in Comparative Example 1-1 and Comparative Example 1-2 are ion conductors that contain a hydrocarbon-based block copolymer and include hydrophilic repeating units and hydrophobic repeating units and thus are capable of easily modifying the structure and the properties of the block copolymer and the ion conductor can be easily controlled by controlling the structure of the hydrophilic repeating unit and the hydrophobic repeating unit.

In view of the characteristics varied according to the control of the molar ratios of the hydrophilic repeating unit to the hydrophobic repeating unit of the ion conductors, it is noted that the ion conductor having a relatively high molar ratio of the hydrophilic repeating unit (i.e., the molar ratio of 1:2.5) has ion exchange ability or ion conductivity superior to that of the ion conductor having a relatively high molar ratio of the hydrophobic repeating unit (i.e., the molar ratio of 1:3.5). However, it can be seen that the ion conductor having a relatively high molar ratio of the hydrophobic repeating unit is advantageous in terms of water content, and secures dimensional stability even at the same membrane thickness and thus exhibits excellent shape stability.

In particular, swelling of the polymer electrolyte membrane is a factor that greatly affects durability. When shape stability is secured, the durability of the polymer electrolyte membrane on the fuel cell increases and thus the overall durability of the fuel cell can be improved.

Experimental Example 2: Morphological Analysis of Produced Polymer Electrolyte Membrane AFM images of one surface and the other surface of the polymer electrolyte membrane produced in Example 1-1 are shown in FIGS. 5 and 6, respectively.

Figure 5:
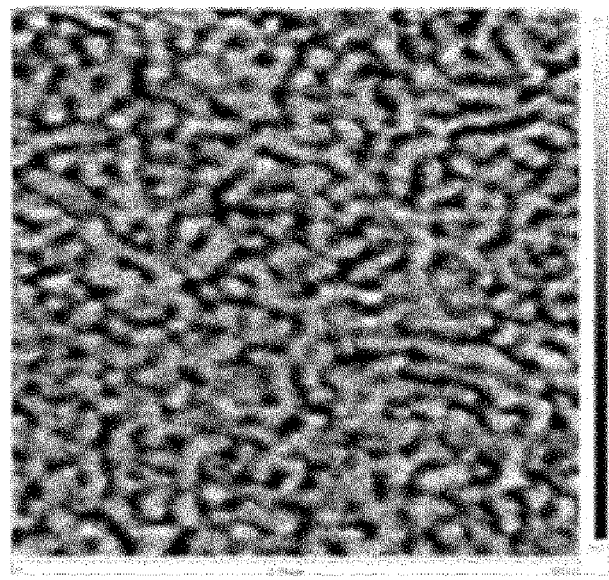
FIGS. 5 and 6 are AFM images showing one surface and the other surface of the polymer electrolyte membrane prepared in Example 1-1 of the present disclosure.
Figure 6:
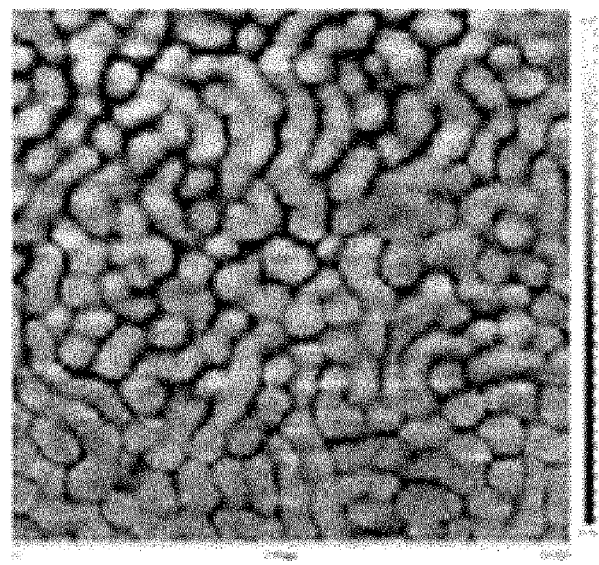

Specifically, FIG. 5 is an AFM image showing one surface of the polymer electrolyte membrane impregnated with an ion conductor having a relatively high molar ratio of a hydrophobic repeating unit, that is, the ion conductor produced in Production Example 1-1, and having a molar ratio of the hydrophilic repeating unit:hydrophobic repeating unit of 1:3.5, and FIG. 6 is an AFM image showing one surface of the polymer electrolyte membrane impregnated with an ion conductor having a high molar ratio of a hydrophilic repeating unit, that is, the ion conductor produced in Production Example 1-2, and having a molar ratio of hydrophilic repeating unit:hydrophobic repeating unit of 1:2.5.

As can be seen from FIGS. 5 and 6, the morphology of ion conductors having different molar ratios of hydrophilic repeating units:hydrophobic repeating units was observed, which indicates that the structure of the ion conductor can be controlled by controlling the molar ratio of hydrophilic repeating units:hydrophobic repeating units of the ion conductor.

Specifically, comparing the ion channel formation between the ion conductor having a high molar ratio of a hydrophobic repeating unit, that is, an ion conductor having a molar ratio of hydrophilic repeating unit:hydrophobic repeating unit of 1:3.5, and an ion conductor having a high molar ratio of a hydrophilic repeating unit, that is, an ion conductor having a molar ratio of hydrophilic repeating unit:hydrophobic repeating unit of 1:2.5, the ion-conducting channel size of the ion conductor having a relatively high molar ratio of the hydrophobic repeating unit was relatively small. That is, it can be seen that the ion conductor having a relatively high molar ratio of the hydrophobic repeating unit has a smaller hydrophilic channel size formed by phase separation of the hydrophilic repeating unit. As a result, it can be seen that the shape stability and durability of the polymer electrolyte membrane can be secured.

Example 2: Production of Polymer Electrolyte Membrane

Example 2-1

An ionic conductor solution containing 30% by weight of a fluorinated polymer (Dyneon, 3M) having an equivalent weight (EW) of 725 and side chain lengths including a of 0 and b of 3 in Formula 1 was prepared as a first ion conductor solution, and an ionic conductor solution containing 30% by weight of a fluorinated polymer (Dyneon, 3M) having an equivalent weight (EW) of 800 and side chain lengths including a of 0 and b of 4 in Formula 1, was prepared as a second ion conductor solution.

Then, the ion conductor solutions were each impregnated in one surface and the other surface of the hybrid composite porous support produced in Production Example 2-2 to produce a polymer electrolyte membrane.

Comparative Example 2-1

An ionic conductor solution (Chemours, Nafion solution product) containing 5% by weight of a fluorinated polymer having an equivalent weight (EW) of 1100 and side chain lengths including a of 0 and b of 2 in Formula 1 was prepared.

Then, the ionic conductor solution was impregnated in a PTFE porous support including a fluorinated polymer and having a plurality of pores formed by the microstructure of polymer fibrils, thereby producing a polymer electrolyte membrane.

Experimental Example 3: Performance Analysis of Produced Polymer Electrolyte Membrane The unit cell performance and the open circuit voltage (OCV) retention rate of the polymer electrolyte membranes produced in Examples and Comparative Examples above were measured and the results are shown in Tables 2 and 3 below.

The unit cell performance of the polymer electrolyte membranes was evaluated by preparing the following device and measuring the electrochemical properties.

The device for measuring energy efficiency was configured to include a unit cell having an electrode area of 25 cm$^2$ and a microporous layer located on both sides thereof to measure the unit cell performance of the fuel cell. The fuel cell was operated by supplying hydrogen and air that had passed through a humidifier to respective electrodes. The unit cell performance was measured at 65° C. and a relative humidity of 100%, and the current density values at 0.6 V are shown for comparison. The open circuit voltage retention rate was measured through an open circuit voltage operation at 90° C. and a relative humidity of 30%, and is expressed as the difference between the initial open circuit voltage and the open circuit voltage after operation for 500 hours.

Experimental Example 4: Performance Analysis of Produced Polymer Electrolyte Membrane The dimensional change rates and hydrogen permeability of the polymer electrolyte membranes produced in Example 1-1, Comparative Example 1-3 and Comparative Example 1-4 were measured, and the results are shown in Table 4 below.

The dimensional change (shrinkage) in Table 4 below was determined by immersing a sample in water at 100° C. for 10 minutes, taking out the sample therefrom, allowing the sample to stand at room temperature for 30 minutes and measuring a shrinkage in the longitudinal direction before and after immersion.

In addition, the hydrogen permeability was determined as a current density corresponding to a slope measured at a temperature of 65° C. and a relative humidity of 100% after preparing a sample as a membrane-electrode assembly, supplying hydrogen and nitrogen, that have passed through a humidifier, to both electrodes, respectively.

TABLE 2

|   | Hydrophilic: hydrophobic molar ratio | Membrane thickness (μm) | Cell performance (mA/cm$^2$) | OCV variation (%) |
|---|---|---|---|---|
| Comp. Ex. 1-1 | 1:3.5 | 22~23 | 1045 | 95 |
| Comp. Ex. 1-2 | 1:2.5 | 22~23 | 1027 | 97 |
| Ex. 1-1 | 1:2.5 + 1:3.5[1] | 22~23 | 1128 | 97 |
| Commercially available membrane (Nafion 211) | — | 25 | 1184 | 89 |

[1] The thickness ratio of the first ion conductor produced in Production Example 1-2, in which the molar ratio of the hydrophilic repeating unit is relatively high, and the second ion conductor produced in Production Example 1-1, in which the molar ratio of the hydrophobic repeating unit is relatively high, is 7:3. In this case, the thickness ratio is the sum of the thickness of the ion conductor layer formed on the surface of the hybrid composite porous support and the thickness of the ion conductor layer impregnated in the hybrid composite porous support.

TABLE 3

|   | Length of side chain | Membrane thickness (μm) | Cell performance (mA/cm$^2$) | OCV variation (%) |
|---|---|---|---|---|
| EX. 2-1 | a = 0, b = 3 + a = 0, b = 4 | 20~23 | 1248 | 96 |
| Comp. 2-1 | a = 1, b = 2 | 20~23 | 1140 | 90 |

As can be seen from Table 2, in the case of the polymer electrolyte membrane produced in Example above, the cell performance reflects the performance of the ion conductor having a relatively high molar ratio of hydrophilic repeating unit and thus exhibiting excellent ion conductivity, the open circuit voltage retention rate reflects the performance of the ion conductor having a relatively high molar ratio of the hydrophobic repeating unit and thus exhibiting excellent durability, and the overall system efficiency is improved compared to the polymer electrolyte membrane prepared in the comparative example.

In addition, as can be seen from Table 3, the polymer electrolyte membrane produced in Example above includes two types of ion conductors, which are fluorinated polymers having side chains having different lengths, thereby exhibiting higher cell performance and open circuit voltage retention rate compared to the polymer electrolyte membrane including only one type of ion conductor produced in Comparative Example.

TABLE 4

|   | Support structure | Membrane thickness (μm) | Dimensional change(%) | Hydrogen permeability (mA/cm$^2$) |
|---|---|---|---|---|
| Ex. 1-1 | nanoweb + e-PTFE + nanoweb | 20~23 | 3 or less | 1.6 |
| Comp. Ex. 1-3 | nanoweb + nanoweb | 20~23 | 1 or less | 2.8 |
| Comp. Ex. 1-4 | e-PTFE + e-PTFE | 20~23 | 15 | 1.5 |

As can be seen from Table 4, the polymer electrolyte membrane produced in Comparative Example 1-3 includes a porous support having two layers of nanowebs stacked, thus exhibiting a small dimensional change but very high hydrogen permeability. The polymer electrolyte membrane produced in Example 1-4 includes the porous support in which two layers of the fluorine-based support are stacked, thereby exhibiting low hydrogen permeability but a very large dimensional change rate.

Meanwhile, it can be seen that the polymer electrolyte membrane produced in Example 1-1 includes a porous support, in which heterogeneous (hybrid) materials of the fluorine-based support and the nanoweb are combined, thereby reducing hydrogen permeability while having a small dimensional change.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

DESCRIPTION OF REFERENCE NUMERALS

1: Solution tank
2: Metering pump
3: Nozzle
4: Integration unit
6: High voltage generator
10: Hybrid composite porous support
11: Fluorine-based support
12: Nanoweb
20: First ion conductor
21: First ion conductor layer 30: Second ion conductor
31: Second ion conductor layer
100: Membrane-electrode assembly
120, 120': Electrodes
130, 130': Catalyst layers
140, 140': Electrode substrates
150: Polymer electrolyte membrane
200: Fuel cell
210: Fuel supply 220: Reformer
230: Stack 231: First supply tube
232: Second supply tube 233: First discharge tube
234: Second discharge tube 240: Oxidizing agent supply

INDUSTRIAL AVAILABILITY

The present disclosure provides a polymer electrolyte membrane, a method of producing the same and a membrane-electrode assembly including the same. The polymer electrolyte membrane has excellent durability and ionic conductivity and is capable of reducing hydrogen permeability.

The invention claimed is:

1. A polymer electrolyte membrane comprising:
a hybrid composite porous support, the hybrid composite porous support comprising a fluorine-based support including a plurality of pores due to a microstructure of polymer fibrils, and a nanoweb located on one or both surfaces of the fluorine-based support and including nanofibers which are integrated into a non-woven fabric such that the nanoweb includes a plurality of pores; and
an ion conductor filling pores of the hybrid composite porous support.

2. The polymer electrolyte membrane according to claim 1, wherein the nanoweb is formed on one or both surfaces of the fluorine-based support by electrospinning.

3. The polymer electrolyte membrane according to claim 1, wherein the fluorine-based support has a thickness of 2 μm to 40 μm and the nanoweb has a thickness of 10 μm to 50 μm.

4. The polymer electrolyte membrane according to claim 1, wherein the polymer electrolyte membrane comprises the hybrid composite porous support that comprises any one selected from the group consisting of a first ion conductor layer including a first ion conductor located on one surface of the hybrid composite porous support, a second ion conductor layer including a second ion conductor located on the other surface of the hybrid composite porous support, and a combination of the first ion conductor layer and the second ion conductor layer.

5. The polymer electrolyte membrane according to claim 4, wherein the hybrid composite porous support comprises the first ion conductor filling the pores in the one surface of the hybrid composite porous support, on which the first ion conductor layer is located, and the second ion conductor filling the pores in the other surface of the hybrid composite porous support, on which the second ion conductor layer is located.

6. The polymer electrolyte membrane according to claim 4, wherein the first ion conductor and the second ion conductor are different from each other in terms of equivalent weight (EW).

7. The polymer electrolyte membrane according to claim 6, wherein the first ion conductor and the second ion conductor are fluorinated polymers containing a fluorinated carbon skeleton and a side chain represented by the following Formula 1, and the first ion conductor and the second ion conductor have different side chain lengths:

—(OCF$_2$CFR$_f$)$_a$—O—(CF$_2$)$_b$—X    [Formula 1]

wherein R$_f$ is each independently selected from the group consisting of F, Cl and a fluorinated alkyl group having 1 to 10 carbon atoms;
X is an ion-conducting group;
a is a real number of 0 to 3; and
b is a real number of 1 to 5.

8. The polymer electrolyte membrane according to claim 4, wherein the first ion conductor and the second ion conductor are polymers containing a hydrophilic repeating unit and a hydrophobic repeating unit, and the first ion conductor and the second ion conductor have different molar ratios of the hydrophilic repeating unit to the hydrophobic repeating unit.

9. The polymer electrolyte membrane according to claim 8, wherein a molar ratio of the hydrophilic repeating unit to the hydrophobic repeating unit of the first ion conductor is higher than a molar ratio of the hydrophilic repeating unit to the hydrophobic repeating unit of the second ion conductor.

10. A method for producing a polymer electrolyte membrane, the method comprising:
preparing a fluorine-based support having a plurality of pores due to a microstructure of polymer fibrils;
forming a nanoweb on one or both surfaces of the fluorine-based support by electrospinning, the nanoweb including nanofibers integrated into a nonwoven fabric having a plurality of pores, thereby producing a hybrid composite porous support; and
filling the pores of the hybrid composite porous support with an ion conductor.

11. The method according to claim 10, wherein the filling the pores of the hybrid composite porous support with the ion conductor comprises:
forming a first ion conductor layer including a first ion conductor on one surface of the hybrid composite porous support; and
forming a second ion conductor layer including a second ion conductor on the other surface of the hybrid composite porous support.

12. A membrane-electrode assembly comprising:
an anode and a cathode facing each other; and
the polymer electrolyte membrane according to claim 1, positioned between the anode and the cathode.

13. A full cell comprising the membrane-electrode assembly according to claim 12.

* * * * *